United States Patent
Fisher et al.

(10) Patent No.: US 7,870,055 B2
(45) Date of Patent: Jan. 11, 2011

(54) METHOD AND SYSTEM FOR PROVIDING SIMULTANEOUS ON-LINE AUCTIONS

(75) Inventors: Alan S. Fisher, Pleasanton, CA (US); Samuel Jerrold Kaplan, Hillsborough, CA (US)

(73) Assignee: eBay Inc., San Jose, CA (US)

( * ) Notice: Subject to any disclaimer, the term of this patent is extended or adjusted under 35 U.S.C. 154(b) by 1491 days.

(21) Appl. No.: 10/316,298

(22) Filed: Dec. 10, 2002

(65) Prior Publication Data

US 2003/0088502 A1    May 8, 2003

Related U.S. Application Data

(63) Continuation of application No. 09/706,849, filed on Nov. 7, 2000, which is a continuation of application No. 08/624,259, filed on Mar. 29, 1996, now Pat. No. 6,243,691.

(51) Int. Cl.
*G06Q 40/00* (2006.01)
(52) U.S. Cl. ......................................................... 705/37
(58) Field of Classification Search ............... 705/35–37
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 3,687,256 A | 8/1972 | Jones | |
| 4,071,697 A | 1/1978 | Bushnell et al. | |
| 4,412,287 A | 10/1983 | Braddock, III | |
| 4,674,044 A | 6/1987 | Kalmus et al. | |
| 4,677,552 A | 6/1987 | Sibley, Jr. | |
| 4,789,928 A | 12/1988 | Fujisaki | |
| 4,799,156 A | 1/1989 | Shavit et al. | |
| 4,823,265 A | 4/1989 | Nelson | |
| 4,845,625 A | 7/1989 | Stannard | |
| 4,864,516 A | 9/1989 | Gaither et al. | |
| 4,903,201 A | 2/1990 | Wagner | |
| 4,992,940 A | 2/1991 | Dworkin | |
| 5,063,507 A | 11/1991 | Lindsey et al. | |
| 5,077,665 A | 12/1991 | Silverman et al. | |
| 5,101,353 A | 3/1992 | Lupien et al. | |

(Continued)

FOREIGN PATENT DOCUMENTS

FR       2 658 635       8/1991

(Continued)

OTHER PUBLICATIONS

"Electronic Bonds Auction," PC Weeks, vol. 6, No. 22, Jun. 5, 1989, p. 68.

(Continued)

*Primary Examiner*—Richard C Weisberger
(74) *Attorney, Agent, or Firm*—Schwegman, Lundberg & Woessner, P.A.

(57) ABSTRACT

A method and system for providing simultaneous online auctions includes automatically auctioning a first item and a second item during a common time period via an electronic auction system. Bids for both of the first item and the second item are automatically received at the electronic auction system during the common time period.

15 Claims, 12 Drawing Sheets

U.S. PATENT DOCUMENTS

| | | | |
|---|---|---|---|
| 5,136,501 | A | 8/1992 | Silverman et al. |
| 5,168,446 | A | 12/1992 | Wiseman |
| 5,205,200 | A | 4/1993 | Wright |
| 5,243,515 | A | 9/1993 | Lee |
| 5,258,908 | A | 11/1993 | Hartheimer et al. |
| 5,280,305 | A | 1/1994 | Monroe et al. |
| 5,280,422 | A | 1/1994 | Moe et al. |
| 5,283,731 | A | 2/1994 | Lalonde et al. |
| 5,285,383 | A | 2/1994 | Lindsey et al. |
| 5,297,031 | A | 3/1994 | Gutterman et al. |
| 5,297,032 | A | 3/1994 | Trojan et al. |
| 5,305,200 | A | 4/1994 | Hartheimer et al. |
| 5,310,997 | A | 5/1994 | Roach et al. |
| 5,317,683 | A | 5/1994 | Hager et al. |
| 5,325,297 | A | 6/1994 | Bird et al. |
| 5,329,589 | A | 7/1994 | Fraser et al. |
| 5,335,170 | A | 8/1994 | Petteruti et al. |
| 5,345,091 | A | 9/1994 | Craig |
| 5,375,055 | A | 12/1994 | Togher et al. |
| 5,383,113 | A | 1/1995 | Kight et al. |
| 5,394,324 | A | 2/1995 | Clearwater |
| 5,402,336 | A | 3/1995 | Spiegelhoff et al. |
| 5,424,944 | A | 6/1995 | Kelly |
| 5,426,281 | A | 6/1995 | Abecassis |
| 5,428,778 | A | 6/1995 | Brookes |
| 5,453,926 | A | 9/1995 | Stroschin et al. |
| 5,485,510 | A | 1/1996 | Colbert |
| 5,521,815 | A | 5/1996 | Rose, Jr. |
| 5,526,479 | A | 6/1996 | Barstow et al. |
| 5,553,145 | A | 9/1996 | Micali |
| 5,557,728 | A | 9/1996 | Garrett et al. |
| 5,592,375 | A | 1/1997 | Salmon et al. |
| 5,598,557 | A | 1/1997 | Doner et al. |
| 5,629,982 | A | 5/1997 | Micali |
| 5,640,569 | A | 6/1997 | Miller et al. |
| 5,657,389 | A | 8/1997 | Houvener |
| 5,664,111 | A | 9/1997 | Nahan et al. |
| 5,664,115 | A | 9/1997 | Fraser |
| 5,675,784 | A | 10/1997 | Maxwell et al. |
| 5,689,652 | A | 11/1997 | Lupien et al. |
| 5,694,546 | A | 12/1997 | Reisman |
| 5,706,457 | A | 1/1998 | Dwyer et al. |
| 5,708,780 | A | 1/1998 | Levergood et al. |
| 5,710,889 | A | 1/1998 | Clark et al. |
| 5,715,314 | A | 2/1998 | Payne et al. |
| 5,715,402 | A | 2/1998 | Popolo |
| 5,717,989 | A | 2/1998 | Tozzoli et al. |
| 5,727,165 | A | 3/1998 | Ordish et al. |
| 5,760,917 | A | 6/1998 | Sheridan |
| 5,761,655 | A | 6/1998 | Hoffman |
| 5,771,291 | A | 6/1998 | Newton et al. |
| 5,771,380 | A | 6/1998 | Tanaka et al. |
| 5,774,873 | A | 6/1998 | Berent et al. |
| 5,778,367 | A | 7/1998 | Wesinger, Jr. et al. |
| 5,790,790 | A | 8/1998 | Smith et al. |
| 5,794,207 | A | 8/1998 | Walker et al. |
| 5,794,219 | A * | 8/1998 | Brown .................. 705/37 |
| 5,799,285 | A | 8/1998 | Klingman |
| 5,803,500 | A | 9/1998 | Mossberg |
| 5,818,914 | A | 10/1998 | Fujisaki |
| 5,826,241 | A | 10/1998 | Stein et al. |
| 5,826,244 | A | 10/1998 | Huberman |
| 5,835,896 | A | 11/1998 | Fisher et al. |
| 5,845,265 | A | 12/1998 | Woolston |
| 5,845,266 | A | 12/1998 | Lupien et al. |
| 5,848,139 | A | 12/1998 | Grover |
| 5,850,442 | A | 12/1998 | Muftic |
| 5,872,848 | A | 2/1999 | Romney et al. |
| 5,873,069 | A | 2/1999 | Reuhl et al. |
| 5,884,056 | A | 3/1999 | Steele |
| 5,890,138 | A | 3/1999 | Godin et al. |
| 5,905,975 | A | 5/1999 | Ausubel |
| 5,913,040 | A | 6/1999 | Rakavy et al. |
| 5,922,074 | A | 7/1999 | Richard et al. |
| 5,963,915 | A | 10/1999 | Kirsch |
| 6,006,201 | A | 12/1999 | Berent et al. |
| 6,026,383 | A | 2/2000 | Ausubel |
| 6,035,402 | A | 3/2000 | Vaeth et al. |
| 6,047,264 | A | 4/2000 | Fisher et al. |
| 6,049,785 | A | 4/2000 | Gifford |
| 6,058,379 | A | 5/2000 | Odom et al. |
| 6,085,176 | A | 7/2000 | Woolston |
| 6,104,815 | A | 8/2000 | Alcorn et al. |
| 6,119,137 | A | 9/2000 | Smith et al. |
| 6,161,099 | A | 12/2000 | Harrington et al. |
| 6,178,408 | B1 | 1/2001 | Copple et al. |
| 6,192,407 | B1 | 2/2001 | Smith et al. |
| 6,202,051 | B1 | 3/2001 | Woolston |
| 6,243,691 | B1 | 6/2001 | Fisher et al. |
| 6,266,651 | B1 | 7/2001 | Woolston |
| 6,266,652 | B1 | 7/2001 | Godin et al. |
| 6,338,050 | B1 | 1/2002 | Conklin et al. |
| 6,415,270 | B1 | 7/2002 | Rackson et al. |
| 6,430,545 | B1 | 8/2002 | Honarvar et al. |
| 6,449,601 | B1 | 9/2002 | Friedland et al. |
| 6,499,018 | B1 | 12/2002 | Alaia et al. |
| 6,871,190 | B1 | 3/2005 | Seymour et al. |
| 7,003,485 | B1 * | 2/2006 | Young .................. 705/37 |
| 7,133,835 | B1 | 11/2006 | Fusz et al. |
| 7,395,238 | B2 | 7/2008 | Alaia et al. |
| 7,461,022 | B1 | 12/2008 | Churchill et al. |
| 2001/0037278 | A1 | 11/2001 | Messmer et al. |
| 2003/0208408 | A1 | 11/2003 | Garg et al. |
| 2005/0033648 | A1 | 2/2005 | Jin et al. |

FOREIGN PATENT DOCUMENTS

| | | |
|---|---|---|
| NL | 9300266 | 9/1994 |
| WO | WO 92/15174 | 9/1992 |
| WO | WO 96/34356 | 10/1996 |
| WO | WO-9737315 A1 | 10/1997 |

OTHER PUBLICATIONS

Massimb, Marcel N. and Phelps, Bruce D., "Electronic Trading, Market Structure and Liquidity," Financial Analysts Journal, Jan.-Feb. 1994, pp. 39-50 (and cover).

Pope, Christina, "What Am I Bid? Check the Modem: Electronic Auctions Come to Real Estate," The Greater Baton Rouge Business Report, vol. 11, No. 26, Jul. 27, 1993, p. 27.

Post, D.L. et al., "Application of Auctions as a Pricing Mechanism for the Interchange of Electric Power," IEEE Transactions on ER Systems, vol. 10, No. 3, Aug. 1995, pp. 1580-1584 (and cover).

"Save the Earth Foundation: Internet Online Rock and Roll Art Auction Celebrating Earth Day is Declared Open to the World for One Month," Business Wire, Apr. 24, 1995, © 1999 Business Wire, 2 pgs.

"", *American Law Institute, Draft-Uniform Commercial Code Revised Article 2 (Sales0, Parts 2, 3 and 7, printed from* http://www.kentlaw.edu/ulc/uniform/uccart2/chap2/ucc2c237.html, (Jan. 4, 1996), pp. 1-15.

"", *Internet Presence, Inc. Newsgroup Posting Re: Announce: Internet ShopKeeper*, (Aug. 2, 1994), 2 pgs.

"", http://www.webopedia.com/TERM/d/daemon.html, (Jun. 2, 2004), 2 pgs.

"", *Numismatists Online Letter and Numismatist Online dealer member agreement*, (Sep. 9, 1995).

"A Beginner's Guide to HTML", *NCSA/pubs@ncsa.uiuc.edu, Appendix A, mailed to the USPTO* Oct. 24, 1994, 11 pgs.

"Affinity Traders Online Business Plan", (Aug. 18, 1995), 29 pgs.

"AMIX Demo Screen Shots", *Dan Bricklin's Demo 11 Computer Program*, Sage Software, (Copyright 1990, 1991), 49 pgs.

"U.S. Appl. No. 08/624,259, Non-Final Office Action mailed May 19, 1998", 6 pgs.

"U.S. Appl. No. 08/624,259, Non-Final Office Action mailed Nov. 30, 1999", 10 pgs.

"U.S. Appl. No. 08/624,259, Notice of Allowance mailed Jul. 6, 2000", 6 pgs.

"U.S. Appl. No. 08/624,259, Response filed Apr. 27, 2000 to Non-Final Office Action mailed Nov. 30, 1999", 7 pgs.

"Chicago Firm Offers Internet Brokerage Services", *Simba Information, Inc., Media Daily*, (Dec. 21, 1994), Section No. 342, vol. 2.

"Competition in the Dutch Flower Markets", (Nov. 6, 2001), 7 pgs.

"Confidential Deposition of Jason Robert Surratt", *MercExchange, L.L.C. v. eBay Inc., and Returnbuy, Inc., United States District Court Eastern District of Virginia Norfolk Division, Civil Action No. 2:01-CV-736*, (Jun. 20, 2002), 47 pgs.

"Corrected Brief of Appellants", *In the United States Court of Appeals for the Federal Circuit, Case No. 03-1600, -1616, MercExchange, L.L.C. v. eBay, Inc. and Half.com, Inc.*, (Jan. 6, 2004), 70 pgs.

"Disposition of Alan Fisher, vol. 1", *MercExchange, L.L.C. v. eBay Inc., and Returnbuy, Inc., United States District Court Eastern District of Virginia Norfolk Division, Civil Action No. 2:01-CV-736*, (Jun. 18, 2002), 22 pgs.

"Disposition of Alan Fisher, vol. II", *MercExchange, L.L.C. v. eBay Inc., and Returnbuy, Inc., United States District Court Eastern District of Virginia Norfolk Division, Civil Action No. 2:01-CV-736*, (Jun. 19, 2002), 24 pgs.

"Deposition of Jerry Kaplan", *MercExchange, L.L.C. v. eBay Inc., and Returnbuy, Inc., United States District Court Eastern District of Virginia Norfolk Division, Civil Action No. 2:01-CV-736*, (Jun. 18, 2002), 49 pgs.

"Deposition of Pierre Omidyar", *MercExchange, L.L.C. v. eBay Inc., and Returnbuy, Inc., United States District Court Eastern District of Virginia Norfolk Division, Civil Action No. 2:01-CV-736*, (Jun. 4, 2002), 14 pgs.

"Deposition of Thomas Woolston", *MercExchange, L.L.C. v. eBay Inc., and Returnbuy, Inc., United States District Court Eastern District of Virginia Norfolk Division, Civil Action No. 2:01-CV-736*, (Apr. 16, 2002), 52 pgs.

"FCC Will Allow Remote Electronic Bidding in Oct. 26 Narrowband PCS Auction", *Common Carrier Week*, (Oct. 10, 1994), 2 pgs.

"First Auction Wins the Bid for Online", *Internet Shopping Network.*, (Jan. 7, 2002), 4 pgs.

"Google Newsgroup RE: press/Digital and Open Market Partner to do Business Over the Internet", *Digital Press & Analysis News*, (Nov. 7, 1994), 3 pgs.

"Mosaic for X version 2.0 Fill-Out form Support", mosaic-x@ncsa.uiuc.edu, *Appendix B, mailed to the USPTO* Oct. 24, 1994, 9 pgs.

"Preview Media and America Online Announce New Travel Services for America online Subscribers", *PR Newswire*, (Feb. 7, 1995), 3 pgs.

"prodigy outline Internet Plans, Launches Services Sep. 24, 1994", *Newsbytes News Network*, (Sep. 29, 1994), 3 pgs.

"Spry's Air Mosaic Express Provides Internet Access to World Wide Wed", *The PC Netter*, (Dec. 1, 1994), vol. 9, No. 12.

"The Evolution of TELCOT the Foundation of 'The Seam'", *TELCOT Plains Cotton Cooperative Association*, (1997), 3 pgs.

"Video Disposition of Thomas Woolston", *MercExchange, L.L.C. v. eBay Inc., and Returnbuy, Inc., United States District Court Eastern District of Virginia Norfolk Division, Civil Action No. 2:01-CV-736*, (Jun. 18, 2002), 79 pgs.

"Video Disposition of Thomas Woolston, vol. 2", *MercExchange, L.L.C. v. eBay Inc., and Returnbuy, Inc., United States District Court Eastern District of Virginia Norfolk Division, Civil Action No. 2:01-CV-736*, (Jun. 19, 2002), 79 pgs.

"Video Deposition of Thomas Woolston, vol. 3", *MercExchange, L.L.C. v. eBay Inc., and Returnbuy, Inc., United States District Court Eastern District of Virginia Norfolk Division, Civil Action No. 2:01-CV-736*, (Jun. 20, 2002), 80 pgs.

"What's new at eBay's Auction Web", http://web.archive.org/web19981202085151/http://www.ebay.com/aw/update.html, AuctionWeb What's New, (May 18, 2005), 6 pgs.

Bakos, J. Y, "A Strategic Analysis of Electronic Marketplaces", *MIS Quarterly* vol. 15, No. 3., (Sep. 1991), p. 295-310.

Baty, J., et al., "InterShop: Enhancing the Vendor/Customer Deialectic in Electronic Shopping", *Journal of Management information Systems* vol. II, No. 4 , (1995), pp. 9-31.

Bikhchandani, S., et al., "The Economics of Treasury Securities Markets", *Journal of Economic Perspectives*, 7 (3) Summer 1993, (1993), 117-134.

Chabrow, E., "A New Era Is Brokered in", *Information Week*, (Sep. 18, 1995), 3 pgs.

Churbuck, D., "Dial-A-Catalog", *Forbes*, (Oct. 10, 1994), p. 126-130.

Clarke, R., "The Strategice Intent of Online Trading Systems a Case Study in National Livestock Marketing", *Xamax Consultancy Ltd.*, (Aug. 16, 1992), 22 pgs.

Clifford, D., "Notes on Community Information Systems", (Dec. 10, 1989), 7 pgs.

Cohen, D., "Computerized Commerce", *Proceedings of the IFIP World Camputer Congress Held* Aug. 28-Sep. 1, 1989, *Reprinted From Information Processing 89*, (Oct. 1989), 27 pages.

Davies, S. A, "Treasury action to 'go live' with computer tenders. (Treasury Automated Auction Processing System, or TAAPS)(Public securities association supplement)", *Bond Buyer* v. 304, n2914, (Apr. 29, 1993), 5 pgs.

Elmer-Dewitt, P., "Battle for the Soul of the Internet", *Time Magazine Cover Story Technology Section*, (Jul. 26, 1994), 10 pgs.

Grant, G., "Mosaic Communications Unveils Network Navigator and Server Software for the Internet", (Sep. 1, 1994), 3 pgs.

Heng-Wah, Choy, "", *Declaration of Choy Heng-Wah Regarding BidBroker Software—an Electronic Auction System filed in MercExchange, LLC v. eBayInc., et al., Case No. 2:01-CV-736 (E.D. Va)*, (Mar. 8, 2002), 13 pgs.

Johnson, et al., "Automated double oral auctions using IBM PC Network", *Association for Computing Machinery, CSC '86 Cincinnati Proceedings*, (Feb. 1986), p. 507.

Kaplan, S. J, "*Intermart*: the Virtual Shopper's Paradise", Intermart, (Dec. 7, 1994), 17 pgs.

Lindsey, D., et al., "TELCOT: An Application of Information Technology for Competitive Advantage in the Cotton Industry", *MIS Quarterly*, (Dec. 1990), p. 347-357.

McGookin, Stephen, "Home-based brokers stay on-line via the Internet—The number of personal on-line brokerage accounts . . . ", *The Financial Times Limited; Financial Times*(London, England), (Nov. 1, 1995), p. 13.

Obraczka, K., et al., "Internet Resource Discovery", (Sep. 1993), p. 8-22.

Omidyar, P., "Google Newsgroup RE: AuctionWeb: Interactive Web Auction", (Sep. 12, 1995), 3 pgs.

Resnick, P., et al., "Twenty-Second Annual Telecommunications Policy Research Conference: Papers Section 2", *Solomons, MD*, (Oct. 1-3, 1994), p. 1-23.

Schwartz, Michael F., "Internet Resource Discovery at the University of Colorado", (Oct. 1992), 16 pgs.

Shamos, M. J, "Expert Report of Michael Ian Shamos Regarding Materiality of Prior Art Regerence Not Disclosed by Patentee", *filed by eBay*, (Sep. 23, 2002), 10 pgs.

Smith, V., "Auctions, Bidding and Contracting: Uses and Theory—An Experimental Comparison of Alternative Rules for Competitive Market Exchange", *New York University Press*, (1983), pp. 307-334.

Smith, V., et al., "Competitive Market Insitutions: Double Auctions vs Sealed Bid-Offer Auctions", *The American Economic Review*, (Mar. 1982), vol. 72, No. 1.

Smith, V., et al., "On Nonbinding Price Controls in a Competitive Market", *The American Economi Review*, (Jun. 1981), vol. 71, No. 3.

Tenenbaum, J., et al., "Development of Network Infrastructure and Services for Rapid Acquisition", (Jan. 2, 1992), 19 pgs.

Tetzeli, R., "Electronic Storefronts on the Internet", *Fortune*, (Nov. 28 ,1994), p. 191.

Traub, "", *MTG: All Editions Rare and Uncommon Auction, rec. games.deckmaster*, (May 9, 1994), 9 pgs.

Voelker, et al., "Mobisaic: an information system for a mobile wireless computing environment", *IEEE*, (1995), pp. 185-190.

"Onsale Joins Fray as Online Shopping Picks Up Speed: Internet Booms", *Computer Reseller News*, (Jun. 5, 1995),73.

Clemons, E. , et al., "Evaluating the prospects for alternative electronic securities markets", *Proceedings of the Twelfth International Conference on Information Systems (ICIS)*, (1991),53-64.

Hauser, R , "Anonymous Delivery of Goods in Electronic Commerce", *IBM Technical Disclosure Bulletin* 39(3), (Mar. 1996),363-366.

Hess, C M., "Computerized Loan Organization System: An Industry Case Study of the Electronic Markets Hypothesis", *MIS Quarterly*, 18(3), (Sep. 1994),251-274.

Lee, H. G., "Electronic brokerage and electronic auction: the impact of IT on market structures", *Proceedings of the Twenty-Ninth Hawaii International Conference on System Sciences*, vol. 4, (Jan. 3-6, 1996),397-406.

Reck, Martin , "Formally specifying an automated trade execution system", *Journal of Systems and Software*, 21(3), (Jun. 1993),245-252.

Schmid, B F., "Electronic Markets—The Development of Electronic Commerce, Electronic Markets", *Newsletter of the Competence Centre, EM—The Development of Electronic Commerce, Electronic Markets*, No. 9/10, (Oct. 1993),3-4.

Siegmann, Ken , "Nowhere to Go but Up", PC Week, 12(42), (Oct. 23, 1995),A5(1), 1-3.

Smith, Charles W., "Auctions, The Social Construction of Value", *University of California Press*, Berkeley, (1990).

Warbelow, A , "Aucnet: TV Auction Network System", *Harvard Business School Case/Study, HBVR#9-190-001*, (Apr. 1996),1-16.

Zwass, Vladimir , "Electronic Commerce: Structures and Issues", *International Journal of Electronic Commerce*, 1(1), www.cba.bgsu.edu,(Fall 1996),3-23.

Underwood, Chris , "A Multiple Round Ascending Auction Process Suitable for the Disposal of Radio Spectrum in New Zealand", (Jan. 17, 1996).

Sharnof, David Muir; "Email Auction Server", 1 page, 1994.

"Interactive Collector: Archive Catalogs", 2 pages, Nov. 1994.

"The Computer Museum Auction", 4 pages, Feb. 1994.

Banatre, J-P, et al. "The Design and Building of Enchere, A distributed Electronic Marketing System". Communications of the Association for Computing Maiciner, New York, NY, US. vol. 29, No. Jan. 1986, pp. 9-29, XP000002077.

Shulman, Richard E., VCS and quick response: Priority Issues for Mass Merhandisers, Oct. 1989 Supermarker Business, v44, n10, pp. 13(4).

Rockoff,Todd E. et al., "Design of an Internet-based system for remote Dutch auctions," Internet Research Electronic Networking Applications and Policy, vol. 5, No. 4, 1995, pp. 10-16.

Booker, Ellis "Mega Real Estate Auction Counts on Imaging," Computerworld, Dec. 7, 1982, p. 20.

Dyson, Esther "Information, Bid and Asked," Forbes, Aug. 29, 1990, p. 92.

Tenenbaum, Jay M. et al., "CommerceNet: Spontaneous Electronic commerce on the Internet," 1995 IEEE Spring Compcon, pp. 38-43.

ONSALE: ONSALE Brings Thrill of Auctions and Bargain Hunting Online; Unique Internet retail service debuts with week-long charity auction for The Computer Museum in Boston Mountain View, CA, May 22, 1995, 4 pgs.

The Computer Museum brings auction block to cyberspace in First Internet Auction, Business Wire, Business Wire, Inc. Mar. 14. 1994, 2 pgs.

"AUCNET TV Auction Network System," Harvard Business School, 9- 190-001, Jul. 19, 1989, 1 pg.

"AUCNET: The Story continues," Harvard Business School, 2-195-122, Jan. 17, 1995, 1 pg.

Cohen, Danny "Electronic Commerce," University of Southern California, Information Sciences Institute, ISI Research Report, ISI/RR-89-244, Oct. 1989, cover, index, pp. 1-19; 31-33.

Franklin, Matthew K. et al., "The Design and Implementation of a Secure Auction Service," 1995 IEEE Symposium on Security and Privacy, Oakland, California, May 8-10, 1995, pp. 2-14.

Graves, Robert L. et al., "An Auction Method for course Registration," INTERFACES 23:5, Sep. Oct. 1993, pp. 81-92.

McCabe, Kevin A. et al., "Smart Computer-Assisted Markets," Science, vol. 254, Oct. 25, 1991, pp. 534-538.

Turoff, Murray et al., "An Electronic Information Marketplace," North-Holland Computer Networks and ISDN Systems 9 (1985), pp. 79-90.

Freeman, Brian et al., "Hosting Services—Linking The information Warehouse to the Information Consumer," IEEE Spring Compcon 1994, pp. 165-171.

Varian, Hal. R. "Economic Mechanism Design for computerized Agents," USENIX Association, Proceedings of the First USENIX Workshop of Electronic Commerce, New York, New York, Jul. 11-12, 1995, pp. 13-21.

Sirbu, Marvin et al., "NetBill: An Internet Commerce System Optimized for Network Delivered Services," IEEE 1995 Spring Compcon, pp. 20-25.

Schmitz, Tom, "California Computer Auctions No Boon for Bargain Hunters", Sep. 13, 1993, San Jose Mercury News, Calif., 4 pgs.

Maskery, Maryann, "Car auction reaches into space", Automotive News, Nov. 25, 1991, p. 6, 3 pgs.

Anderson, Scott et al., "the Efficiency of Experimental Asset Markets: Empirical Robustness and Subject Sophistication," Research in Experimental Economics, The Journal of Economic Education, Fall 1993, vol. 24, No. 4, pp. 107-190.

Williams, Arlington W. and Walker, James M. "Computerized Laboratory Exercises for Microeconomics Education: Three Applications Motivated by Experimental Economics" The Journal of Economic Education Fall 1993 vol. 24 No. 4, 13 pgs.

Saeki, Motosh et al., "Supporting Distributed individual Work in Cooperative Specification Development," Nov. 15, 1995, pp. 232-247.

Helinski, Paul "Automating Web-Site Maintenance Part 2, Perl-based tools to manage your Web site," Web Techniques, Dec. 1996, pp. 75-76 & 78.

"Computer Museum hosts Internet auction," Computerworld, Mar. 28, 1994, 1 pg.

"Seventh Annual Intermac Users Group Education Symposium," Computerworld, Mar. 28, 1994, same page as above reference.

"Auctioning off Relics of the Computer Age," Business Week, Apr. 11, 1994. 1 pg.

"The Computer Museum Brings Auction Block to Cyberspace in First Internet Auction," Mar. 11, 1994 press release, 1 pg.

"First-ever Internet Auction Produces Results for the Computer Museum," Apr. 28, 1994 press release, 4 pgs. (duplicate releases).

"First Internet Auction," Computer Literacy Book Bulletin (no date), 1 pg.

"Unusual Farmland Auction Set," Liquidation Alert, Harrison Scott Publications, Inc., Mar. 28, 1994, 2 pgs.

Edell, Richard J. "Billing Users and Pricing for TCP," IEEE Journal on Selected Areas in Communications, vol. 13, No. 7, Sep. 1995, pp. 1162-1175.

Banatre, Michael, "Distributed Auction Bidding System," Computer Communications, vol. 4, No. 4, Aug. 1981, pp. 179-186.

Kaehler, Ted et al., Research Report, "Betting, Bribery and Bankruptcy-A Simulated Economy that Learns to Predict," IEEE Spring Compcon 1989, pp. 357-361 and cover.

Neo, Boon Siong, "The Implementation of an Electornic Market for Pig Trading in Singapore," The Journal of Strategic Information System Dec. 1992 vol. 1 No. 5, cover, 2 pg. index, pp. 278-288.

Business Report, Feedstuffs, "DTN Superior to Offer Dialing Electronic Acution," Feb. 8, 1993, 1 pg.

Reck, Martin, "Types of Electronic Auctions," ST.GALLEN, Hochschule [no date; ref. at end of article M. Reck: "The Identification and Formal Specificaiton of Electornic Markets Types," paper presented at the IcIS Doctoral Consortium, Dallas (TX), 1992], pp. 236-243.

McCarthy, Gene, "The Electronic Auctioning of Servicing" Mortgage Banking, Dec. 1994, pp. 96-98.

Johnson, Alonzo, "Multiple Unit Double Auction User's Manual," Social Science Working Paper 676, Division Of The Humanities and Social Sciences California Institute of Technology, Jun. 1988. Revised Sep. 1989, pp. E0296352-E0296369.

Forsythe, Robert, Nelson, Forrest, Neumann, George, and Wright, Jack The Iowa Presidential Stock Market: A Field Experiment Research in Experimental Economics, vol. 4, ISBN: 0-89232-652-2, pp. 1-43.

Cassini Resource Exchange User's Guide. California Institute of Technology. E 0296417. Apr. 1993, pp. E0296417-E0296435.

O'Dell, John "Automobiles" The Los Angeles Times copyright, The Times Mirror Company; Los Angeles Times 1994 All Rights Reserved, pp. 13-14.

Thomas, Charles M. "Automotive News" Copyright 1994 Crain Communications Inc. E0270864. Sep. 19, 1994, pp. 11-12.

Omaha World-Herald Company. Omaha World Herald. Sep. 11, 1994. Business Section, pp. E0295270-E0295273.

Ledyard, John O., Porter, David & Rangel, Antonio "Using Computerized Exchange Systems to Solve an Allocation Problem in Project Management," pp. E0296459-E0296484.

Anand, R. et al., Research Report, The Electronic Flea Market, RC 19678 (87230) Jul. 28, 1994, IBM Research Division, cover and pp. 1-18.

Weiss, Aaron "The Virtual Flea market," Internet World, Jun. 1995, pp. 54-57.

Littlefair, T. "Homelink: a unique service," Computer bulletin, Jun. 1986, pp. 12-13.

Copyright 1995 Investor's Business Daily, Inc. Investor's Business Daily Feb. 24, 1995. "How Auction Technology Sped and Enhanced Sale of Radio Licenses," 3 pgs.

Sammer, Harald W. "Online Stock Trading Systems: Study of an Application," IEEE Spring Compcon 1987, pp. 161-162.

Malone,Thomas W. et al., "Electronic Markets and Electronic Hierarchies," Communications of the ACM, vol. 30. No. 6, Jun. 1987, pp. 484-497.

Court of Appeals for the Federal Circuit, In re Schrader, 30 USPQ 2d, 1455-1462; claim 1 of application at issue cited at col. 2, pp. 1456-1462.

Heng-Wah, Choy, "Electronic Stamp Auction," Google Groups View Thread, Jun. 17, 1994, 1 pg.

Jackson, Ed, "Too much commercial offers," Google Groups, Mar. 13, 1996, 2 pgs.

U.S. Appl. No. 09/504,261, mailed Jul. 6, 2006, 6 pgs.

U.S. Appl. No. 09/504,261, Final Office Action mailed Nov. 27, 2009, 12 pgs.

U.S. Appl. No. 09/504,261, Response filed Jul. 16, 2009 to Non Final Office Action mailed Apr. 16, 2009, 10 pgs.

U.S. Appl. No. 09/706,849, mailed May 28, 2009, 2 pgs.

U.S. Appl. No. 09/706,849, Non-Final Office Action mailed Jun. 5, 2009, 13 pgs.

U.S. Appl. No. 09/706,849, Response filed Dec. 7, 2009 to Non Final Office Action mailed Jun. 16, 2009, 14 pgs.

U.S. Appl. No. 10/316,292, Response filed Oct. 31, 2007 to Restriction Requirement mailed Aug. 1, 2007, 8 pgs.

U.S. Appl. No. 10/316,292, Restriction Requirement mailed Aug. 1, 2007, 6 pgs.

U.S. Appl. No. 10/316,293, mailed Aug. 10, 2007, 2 pgs.

U.S. Appl. No. 10/316,296, Preliminary Amendment filed Apr. 28, 2005, 3 pgs.

U.S. Appl. No. 10/316,324, mailed May 28, 2009, 2 pgs.

U.S. Appl. No. 10/316,324, Non- Final Office Action mailed Jun. 5, 2009, 22 pgs.

U.S. Appl. No. 10/316,324, Response filed Dec. 7, 2009 to Non Final Office Action mailed Jun. 16, 2009, 9 pgs.

U.S. Appl. No. 10/316,325, Preliminary Amendment filed Apr. 28, 2005, 3 pgs.

U.S. Appl. No. 10/316,325, Response filed Dec. 29, 2008 to Non Final Office Action mailed Jun. 27, 2008, 17 pgs.

U.S. Appl. No. 10/316,326, Examiner Interview Summary mailed May 29, 2009, 2 pgs.

U.S. Appl. No. 10/316,326, Non-Final Office Action mailed Jun. 3, 2009, 12 pgs.

U.S. Appl. No. 10/316,326, Response filed Dec. 3, 2009 to Non Final Office Action mailed Jun. 4, 2009, 14 pgs.

U.S. Appl. No. 10/316,326, Response filed Dec. 29, 2008 to Final Office Action mailed Jun. 25, 2008, 16 pgs.

U.S. Appl. No. 10/318,676, Examiner Interview Summary mailed Oct. 30, 2007, 2 pgs.

U.S. Appl. No. 10/318,676, Preliminary Amendment filed Apr. 28, 2005, 3 pgs.

U.S. Appl. No. 10/318,676, Response filed Dec. 29, 2008 to Non Final Office Action mailed Jun. 26, 2008, 17 pgs.

U.S. Appl. No. 10/733,700, Advisory Action mailed Sep. 9, 2008, 3 pgs.

U.S. Appl. No. 10/733,700, Non- Final Office Action mailed Jun. 10, 2009, 14 pgs.

U.S. Appl. No. 10/733,700, Response filed Apr. 16, 2009 to Restriction Requirement mailed Mar. 19, 2009, 13 pgs.

U.S. Appl. No. 10/733,700, Response filed Sep. 10, 2009 to Non Final Office Action mailed Sep. 10, 2009, 15 pgs.

U.S. Appl. No. 10/733,700, Restriction Requirement mailed Mar. 19, 2009, 8 pgs.

U.S. Appl. No. 10/750,052, Pre-Appeal Brief Request for Review filed Sep. 26, 2007, 5 pgs.

U.S. Appl. No. 11/618,632, Final Office Action Mailed Oct. 30, 2009, 19 pgs.

U.S. Appl. No. 11/618,632, Response filed Jun. 24, 2009 to Non Final Office Action mailed Dec. 24, 2008, 16 pgs.

"U.S. Appl. No. 09/706,849, Response filed Oct. 24, 2007 to Non-Final Office Action mailed May 1, 2007", 16 pgs.

"U.S. Appl. No. 09/706,849 Non Final Office Action mailed May 1, 2007", 12 pgs.

"U.S. Appl. No. 09/706,849 Non Final Office Action mailed Jul. 18, 2005", 16 pgs.

"U.S. Appl. No. 09/706,849 Non Final Office Action mailed Oct. 22, 2004", 13 pgs.

"U.S. Appl. No. 09/706,849 Non Final Office Action mailed Nov. 28, 2006", 7 pgs.

"U.S. Appl. No. 09/706,849 Response filed Jan. 11, 2005 to Non Final Office Action mailed Oct. 22, 2004", 11 pgs.

"U.S. Appl. No. No. 09/706,849 Response filed Jan. 18, 2006 to Non Final Office Action mailed Jul. 18, 2005", 12 pgs.

"U.S. Appl. No. 09/706,849 Response filed Feb. 05, 2007 to Non Final Office Action mailed Nov. 28, 2006", 10 pgs.

"U.S. Appl. No. 10/316,292 Non Final Office Action mailed Jan. 18, 2007", 5 pgs.

"U.S. Appl. No. 10/316,292 Response filed Apr. 18, 2007 to Non Final Office Action mailed Jan. 18, 2007", 12 pgs.

"U.S. Appl. No. 10/316,296, Response filed Oct. 4, 2007 to Non-Final Office Action mailed Jun. 4, 2007", 19 pgs.

"U.S. Appl. No. 10/316,296 Non Final Office Action mailed Jun. 4, 2007", 32 pgs.

"U.S. Appl. No. 10/316,297, Response filed Aug. 14, 2007 to Non-Final Office Action mailed May 16, 2007.", 13 pgs.

"U.S. Appl. No. 10/316,325, Response filed Oct. 11, 2007 to Non-Final Office Action mailed Jun. 11, 2007", 16 pgs.

"U.S. Appl. No. 10/316,325 Non Final Office Action mailed Jun. 11, 2007", 36 pgs.

"U.S. Appl. No. 10/316,326, Non-Final Office Action mailed Oct. 30, 2007", OARN,21 pgs.

"U.S. Appl. No. 10/318,676, Response filed Oct. 9, 2007 to Non-Final Office Action mailed Jun. 4, 2007", 17 pgs.

"U.S. Appl. No. 10/318,676 Non Final Office Action mailed Jun. 4, 2007", 31 pgs.

"U.S. Appl. No. 10/319,869, Response filed Oct. 16, 2007 to Non-Final Office Action mailed Jul. 16, 2007", 9 pgs.

"New bidding rules to begin in FCC's auction of airwave", *Austin American Statemen (Newspaper)*, FINAL Edition, (Feb. 4, 1995),D. 5.

Messmer, Ellen , "Car Auctions via Business TV to Debut", *Network World*, vol. 11, Iss. 30, (07 25 94),20.

Milgrom, Paul R., et al., "A Theory of Auctions and Competitive Bidding", *Econometrica*, vol. 50, No. 5, (Sep. 1982),1089-1122.

Oates, Sarah , "Rarin Checks May Be Allowed", *Orlando Sentinal*, (07 13 88),9.

Saunders, Barbara , "Final Gags 'De-vintaging' Rule Contains 2 Major Changes for Negotiations", *Oil Daily*, (Jun. 10, 1986),1-2.

*Cite 34, Hubbard Declaration, Exhibit L*, 2 pgs.

"Subject: Cybercoins -http://www.numismatists.com,~In rec.collecting.coins Google Groups", *Cite 34, Hubbard Declaration, Exhibit H*, (Oct. 16, 1995), 5 pgs.

"A Seat On The Exchange", *Boston computer exchange corporation*, 1987 , 115 pgs.

"Announcing Interactive Coin Auctions on the Web", *Cite 34, Hubbard Declaration, Exhibit G*, 2 pgs.

"U.S. Appl. No. 09/504,261, Non Final Office Action mailed Apr. 16, 2009", 8 pgs.
"U.S. Appl. No. 09/706,849, Non Final Office Action mailed Apr. 7, 2009", 13 pgs.
"U.S. Appl. No. 10/316,326, Non-Final Office Action mailed Apr. 3, 2009", 32 pgs.
"Artsearch Listing Form", Denver Colorado, (late 1980s-early 1990s), 6 pgs.
"Auction Catalog Cybercoins", *Cite 34, Hubbard Declaration, Exhibit J*, (1995), 4 pgs.
"Auction Report", *Cite 34, Hubbard Declaration, Exhibit M*, 6 pgs.
"BPAI decision on Appeal in U.S. Appl. No. 08/427,820", (Jul. 13, 2003), 41 pgs.
"Bringing Numismatists Together, Worldwide", *Cite 34, Hubbard Declaration, Exhibit D*, Hobby Markets Online, (1995), 20 pgs.
"Business Plan for *Intermart*", Intermart, (Jul. 13, 1994), 32 pgs.
"Business Plan for Onsale", *Kaplan Exhibit 20*, (May 1, 1995), 11 pgs.
"Comparison of U.S. Appl. No. 08/427,829 with U.S. Appl. No. 08/554,704", (No date listed), 27 pgs.
"Declaration of Charles R. Plott in support of eBay's opposition to MercExchange's motion for summary judgment that all claims of the '051 patent have an adequate written description", Charles R. Plott, (May 15, 2002), 28 pgs.
"Declaration of Douglas Graham in support of eBay's request for Reexamination of U.S. Patent No. 6202051", Douglas Graham, (Dec. 11, 2006), 8 pgs.
"Declaration of Jonathan Hubbard in support of eBay's request for Reexamination of U.S. Patent No. 6202051", Jonathan Hubbard, (Dec. 10, 2006), 14 pgs.
"Declarations of Michael Ian Shamos, PH.D., J.D.", Michael Ian Shamos, (Jul. 18, 2002), 13 pgs.
"Defendant's proposed Jury Instructions", Perry Blankley, (No date listed), 11 pgs.
"Defendant's statement of controverted facts in opposition to MercExchange, LLC's motion for summary Judgment that all claims of '051 have adequate written description", *eBay*, (May 17, 2002), 16 pgs.
"Design Requirements for Onsale MIS System", *Kaplan Exhibit 21*, (Dec. 3, 1995), 10 pgs.
"District Ct. Trial transcript, MercExchange, LLC v eBay" *2:01-CV-736*, vols. 18B, (2003), 3167-3234.
"District Ct. Trial transcript, MercExchange, LLC v eBay", *2:01-CV-736*, vols. 7B, (2003), 1311-1416.
"eBay Inc. and Half.com's opposition to MercExchange's motion for judgment as a matter of law and Cross motion for judgment as a matter of law of invalidity of all asserted '176 and '265 patent claims", *2:01-CV-736*, (May 20, 2003), 128 pgs.
"eBay's Memorandum in support of its motion for summary judgment that all claims of U.S. Patent No. 6,202,051 are invalid for inadequate written description", *2:01cv736*, (Apr. 1, 2002), 33 pages.
"eBay's post-Markman motion for summary judgment of non-infringement and unenforceability of US patent No. 6,202,051", *2:01-CV-736*, (Nov. 15, 2002), 39 pgs.
"Excerpts of deposition of Alan Fisher vol. I", Alan Fisher, (Jun. 18, 2002), 100 pgs.
"Excerpts of deposition of Jerry Kaplan vol. I", Jerry Kaplan, (Jun. 18, 2002), 80 pgs.
"Expert Report of Arthur Keller", *eBay Non-confidential Expert Reports/Declarations*, (Jun. 9, 2002), 16 pgs.
"Expert Report of Dr Arthur Keller Re Noninfringement", *eBay Non-confidential Expert Reports/Declarations*, (Jun. 28, 2002), 18 pgs.
"Expert Report of Kurt Maly", *eBay Non-confidential Expert Reports/Declarations*, (Jun. 10, 2002), 38 pgs.
"Expert Report of Kurt Maly Re Noninfringement", *eBay Non-confidential Expert Reports/Declarations*, (Jun. 28, 2002), 37 pgs.
"Expert Report of Michael Wellman Ph.D Concerning Noninfringement of the 265 Patent", *eBay Non-confidential Exert Resorts/Declarations*, (Jun. 27, 2002), 36 pgs.
"Expert Report of Michael Wellman Ph.D Concerning the Invalidity of U.S Patent No. 5845265", *eBay Non-confidential Expert Reports/Declarations*, (Jun. 7, 2002), 28 pgs.
"Expert Report of Stephen Crocker", *eBay Non-confidential Expert Reports/Declarations*, (Jun. 10, 2002), 23 pgs.
"Farmers Plugging Into Electronic Cattle Ring", *The Financial Post* (Toronto), *Weekly Edition, Section 4*, (Jan. 1, 1994), p. S11.
"First Virtual Holdings: look, Ma, no crypto!", *Gale Group, LookSmart*, (Jan. 24, 1995), 3 pgs.
"Initial proposal re InterMart", Jerry Kaplan, (Feb. 20, 1995), 5 pgs.
"Interactive Coin Sales Begin Using Online Computers", *Cite 34, Hubbard Declaration, Exhibit K*, Coin World, (Oct. 23, 1995), 66.
"Intermart Architecture and Design", *Fisher Exhibit 8*, (May 1, 1995), 10 pgs.
"Intermart Database Schemes v0.5", *Fisher Exhibit 7*, (Feb. 7, 1995), 13 pgs.
"InterMart Mosaic HTML + Interface Design", Jerry Kaplan, (Dec. 7, 1994), 4 pgs.
"Internet providers take next step towards electronic commerce", *Gale Group*, (Dec. 1994), 2 pgs.
"Interview summary in reexam Control. No. 90/006,984", (Nov. 21, 2006), 26 pgs.
"Letter from Jerry Kaplan to Alan Fisher", *Fisher Exhibit 6*, (Jan. 5, 1995), 5 pgs.
"Letter from Jerry Kaplan to Alan Fisher", *Fisher Exhibit 9*, (Mar. 15, 1995), 2 pgs.
"Letter from Jerry Kaplan to Bruce Kaiser", *Kaplan Exhibit 7*, (Nov. 21, 1994), 1 pg.
"Letter from Jerry Kaplan to Laurent Hubert", *Kaplan Exhibit 10*, (Jan. 29, 1995), 32 pgs.
"Letter from Jerry Kaplan to Michael Baum", *Kaplan Exhibit 5*, (Nov. 18, 1994), 1 pg.
"Letter from Jerry Kaplan to Mike McKinley", *Kaplan Exhibit 3*, (May 16, 1994), 2 pgs.
"Letter from Jerry Kaplan to Scott Cook", *Kaplan Exhibit 18*, (Apr. 9, 1995), 1 pg.
"Letter from Jerry Kaplan to Tom Brokl", *Fisher Exhibit 3*, (Jun. 4, 1994), 1 pg.
"Memo from Jerry Kaplan to Bill Russell-Shapiro", *Kaplan Exhibit 16*, (Mar. 24, 1994), 3 pgs.
"Memo from Jerry Kaplan to Bill Russell-Shapiro", *Kaplan Exhibit 17*, (Apr. 18, 1995), 1 pg.
"Memorandum from Jerry Kaplan to Phil Schlein", *Fisher Exhibit 2*, (Feb. 1, 1994), 5 pgs.
"*MercExchange LLC* v *Ebay inc.*", Civil Action No. 2:01cv736, vol. 19B, Trial Proceedings, Norfolk VA, (May 19, 2003), 12 pgs.
"MercExchange Office Action Response in U.S. Appl. No. 09/253,021", (Jul. 28, 2000), 19 pgs.
"MercExchange Office Action Response in U.S. Appl. No. 09/264,573", (Sep. 14, 1999), 17 pgs.
"MercExchange response to C/N U.S. Appl. No. 90/006,956", (Jun. 26, 2006), 79 pgs.
"MercExchange response to Office Action on U.S. Appl. No. 08/554,704", (Dec. 12, 1997), 12 pgs.
"*MercExchange, LLC* v *eBay* Trial Transcript", *Civil Action No. 2:01cv736*, Vol. 2B, (Apr. 24, 2003), 129 pgs.
"*MercExchange, LLC* v *eBay* Trial Transcript", *Civil Action No. 2:01cv736*, vol. 4B (Apr. 28, 2003), 118 pgs.
"*MercExchange, LLC* v *eBay* Trial Transcript" *Civil Action No. 2:01cv736*, vol. 5B, (Apr. 29, 2003), 103 pgs.
"*MercExchange, LLC* v *eBay* Trial Transcripts", *Civil Action No. 2:01cv736*, vol. 22, (May 22, 2003), 45 pgs.
"Nemo's Inc., Acorn Collectors Service Network. Memphis, TN", (late 1980s), 2 pgs.
"NetBill 1994 Prototype", http://web.archive.org/web/19990203173052/www.netbill.com/, 1 pg.
"NOL Marketing Video", *Cite 34, Hubbard Declaration, Exhibit C*, (1995), 21 pgs.
"Numismatists Online Presents . . . Internet Mail-Bid Auctions", *Cite 34, Hubbard Declaration, Exhibit B*, Numismatists Online, Menlo, Park, California,, (Aug. 1995), 2 pgs.
"OMI Provides Secure Commercial Presence", *Business Communications Co.*, vol. 1, No. 8, (Nov. 1994), p. 1.
"Open Market, Inc. first to offer complete", *Business Wire*, (Oct. 24, 1994), 3 pgs.

"Opening brief on claim construction for US patent '265, 176, 051 submitted by the defendants eBay Inc., Half.com, Inc. and ReturnBuy.com", *2:01-CV-736*, (Jul. 18, 2002), 100 pgs.

"Post-Markman Rebuttal/Supplementation of Stephen Crocker Ph.D.", *eBay Non-confidential Expert Reports/Declarations*, (Dec. 23, 2002), 13 pgs.

"Post-Markman Supplemental Rebuttal Expert Report of Michael Wellman, Ph.D." *eBay Non-confidential Expert Reports/Declarations*, (Mar. 21, 2003), 12 pgs.

"Post-Markman Supplemental Rebuttal Expert Report of Michael Wellman, Ph.D on the Invalidity and Noninfrigement of U.S Patent No. 5845265", *eBay Non-confidential Expert Reports/Declarations*, (Dec. 23, 2002), 56 pgs.

"Save the Earth FNDTN: Internet Online Rock and Roll Art Auction Celebrating Earth Day is Declared Open to the World for One Month; http://www.commerce.com/saveeearth", *Business Wire*, (1995), 2 pgs.

"Subject: Beware Re: Cybercoins—http://www.numismatists.com, In rec.collecting.coins Google Groups", *Cite 34, Hubbard Declaration, Exhibit I*, (Oct. 19, 1995), 2 pgs.

"Supplement to the Expert Report Dr Arthur Keller Addressing Invalidity in View of the Courts Markman and SJ Rulings the Subsequent Opinions of Drs Weaver and Palmer and Noninfringement in View of the Courts Markman Ruling", *eBay Non-confidential Expert Reports/Declarations*, (Dec. 23, 2002), 24 pgs.

"Supplemental Expert Report of Dr Arthur Keller", *eBay Non-confidential Expert Reports/Declarations*, (Aug. 30, 2002), 90 pgs.

"Supplemental Expert Report of Kurt Maly Addressing Newly-Raised Issues in the Mar. 11, 2003 Post-Markman Supplemental Expert Reports of Drs Ophir Frieder and Jonathan Palmer", *eBay Non-confidential Expert Reports/Declarations*, (Undated), 6 pgs.

"System developed by Asset, Management and Control (AMC)", *Declaration of Mark DiMaggio regarding the AMC system*, (Mar. 26, 2002), 1-11.

"The ATOL Conceit", *Cite 34, Hubbard Declaration, Exhibit A*, (Aug. 18, 1995), 29 pgs.

"The Development of Electronic Commerce", *Electronic Markets*, 9/10, (Oct. 1993), 3-4, 23-24, 27-28.

"USPTO Office Communication—U.S. Appl. No. 09/253,014,", *Defendant's Exhibit 453*, (Dec. 12 2000), 8 pgs.

Bernstein, Judith, "Computer Museum Holds An Internet Auction", *Open Systems Today*, 149, (1994), 2 pgs.

Bina, Eric, et al., "Secure access to data over the Internet", Proceedings of the Third International Conference on Parallel and Distributed Information Systems, (1994), 99-102.

Blankenhorn, Dana, "Building the tools for Web commerce", *Interactive Age*, 208, (1995), 34.

Borman, et al., "Electronic Agricultural Auctions in the United Kingdom", *EM—Electronic Markets*, No. 9-10, (Oct. 1993), pp. 27-28

Cox, B., "NetBill Security and Transaction Protocol", *First USENIX Workshop on Electronic Commerce*, (1995), 77-88

Davis, James, "A server for a distributed digital technical report library", *Technical Report TR94-1418, Computer Science Department, Cornell University*, (1994), 8 pgs.

Davis, Jim, et al., ""Drop-in" publishing with the World Wide Web", *Proceedings of the Second International WWW Conference, 1994*, 749-758

Eichmann, David, "Assessing Repository Technology—Where do we go from here?", *NASA-CR-190630 Technical Report*, Research Institute for Computing and Information Science, University of Houston, Clear Lake, (Feb. 28, 1992), 26 pgs.

French, J., et al., "Wide area technical report service: technical reports online", *ACM SIGACT News*, 25(3), (1994), 124-127.

Heng-Wa, Choy, "Bid-Broker business model, rec.collecting.stamps Newsgroup", *Google Groups*, (1994), 1 pg.

Hildesley, C., "Sotheby's Guide to Buying and Selling at Auction., N.Y.", *W. W. Norton & Company*, (1984), 32-33.

Hubbard, J., "Letter to Mr. Brad Schiff", *Cite 34, Hubbard Declaration, Exhibit E*, (Sep. 9, 1995), 5 pgs.

Hubbard, J., "Subject: SF Company Introduces Interactive WWW Auctions", *Cite 34, Hubbard Declaration, Exhibit F*, (Oct. 16, 1995), 2 pgs.

Keller, A., et al., "A Smart Catalog and Brokering Architecture for Electronic Commerce", (Dec. 1994), 14 pgs.

Keller, Arthur, "Declaration of Arthur M. Keller in support of summary judgment of non-infringement of claims 1-9 and 16-41 of '176", *United States District Court, Eastern District of Virginia, Norfolk*, (2003), 14 pgs.

King, Julia, "Digitized art gallery paints retail's future", (Nov. 28, 1994).

Knowles, Anne, "Rival transaction models emerging; on-line authentication schemes check credit cards or users to ensure security. (Open Market Inc's Electronic Commerce Model and CyberCash Inc model)", *PC Week*, 12(12), (Mar. 27, 1995), 49(2).

Kupfer, Andrew, "Software "Agents" will make life easy", *Fortune*, 129(2), (Jan. 24, 1994), 72-73.

Lagoze, Carl, "Dienst: an architecture for distributed document libraries", *Communications of the ACM*, 38(4), (1995), 47.

Lewis, P. H., "Auction of Collectibles on the Internet", *New York Times*, (May 25, 1995), 1 pg.

Lichty, T., "The Official America Online for Macintosh Tour Guide", *2nd Edition, Ventana Press*, (1994).

Maly, K., "Post-Markman Supplemental Expert Report of Kurt Maly Re: Noninfringement and Invalidity of U.S Patent No 6085176", *eBay Non-confidential Expert Reports/Declarations*, (Dec. 20, 2002), 21 pgs.

Medvinsky, G., et al., "Netcash: A Design for Practical Electronic Currency on the Internet", *Information Sciences Institute University of Southern California*, (1993).

Messmer, Ellen, "Harvest time for Web commerce products", *Electronic Commerce*, Network World, Inc., (Oct. 9, 1995), 39.

Neches, Anna-Lena, et al., "FAST system for connecting government suppliers", *Electronic Markets*, 3(3), (1993), 3 pgs.

Pelline, Jeff, "Going Once, Going Twice, Going Online", *San Francisco Chronicle*, (Nov. 13, 1995), 2 pgs.

Sandberg, Jared, "Mosaic, First Data in move to protect credit card transactions on Internet", *Wall Street Journal*, (Nov. 14, 1994), B8.

Sandberg, Jared, "System planned for shopping on the Internet", *Wall Street Journal*, (Sep. 13, 1994), B1.

Schwartz, M., et al., "A comparison of Internet resource discovery approaches", *Computing Systems*, 5(4), (1992), 1-17.

Sharp, Amy, "From Army Knives to Gold Coins, Collectors Attend 'On-Line' Auctions", *Memphis Business Journal*, 8(10), (1986), 4 pgs.

Sirbu, Marvin A., "Internet Billing Service Design and Prototype Implementation", *IMA Intellectual Propert Project Proceedings*, 1(1), http://www.cni.org/docs/ima.ip-workshop/Sirbu.html, (1994), 1-19.

Verity, John, et al., "The Internet: How it will change the way you do business", *Business Week*, (Nov. 14, 1994), 80-88.

Whitaker, Russell Earl, "Subject: American Information Exchange", *Newsgroups: misc.entrepreneurs,bit.listserv.xtropy-l,la.general*, (Jan. 5, 1993), 6 pgs.

Wilson, Claire, "Gallery Hopping On-Line", *International Herald Tribune* (Oct. 29, 1994), 3 pgs.

Wong, W., et al., "Developing an Internet Presence with On-Line Electronic Catalogs", (Oct. 9, 1994), 1-4.

U.S. Appl. No. 10/316,296, filed Dec. 10, 2002, Method and System for Offering an Item for Sale Using a User-Selectable Bid Indicia.

U.S. Appl. No. 10/316,292, filed Dec. 10, 2002, Method and System for Automatically Adjusting a Posting Selling Price.

U.S. Appl. No. 10/316,325, filed Dec. 10, 2002, Method and System for Performing a Bid Quantity Adjustment.

U.S. Appl. No. 10/316,326, filed Dec. 10, 2002, Method and System for Validating a Bid.

U.S. Appl. No. 10/318,676, filed Dec. 13, 2002, Method and System for Performing a Buy or Bid Auction.

U.S. Appl. No. 10/319,868, filed Dec. 13, 2002, Method and System for Providing Status Updates.

U.S. Appl. No. 10/316,324, filed Dec. 10, 2002, Method and System for Performing a Progressive Auction.

U.S. Appl. No. 10/316,297, filed Dec. 10, 2002, Method and System for Performing Proxy Bidding.

U.S. Appl. No. 10/316,293, filed Dec. 10, 2002, Method and System for Updating Information on a Merchandise Catalog Page.

U.S. Appl. No. 10/316,869, filed Dec. 13, 2002, Method and System for Adjusting a Close Time of an Auction.

U.S. Appl. No. 10/648,213, filed Dec. 29, 2006, Method and System to Adjust a Seller Fixed Price Offer.

U.S. Appl. No. 10/618,632, filed Dec. 29, 2006, Method and System to Adjust a Seller Fixed Price Offer.

U.S. Appl. No. 09/504,261, filed Feb. 15, 2000, Method and Apparatus for Performing a Declining Price Auction.

U.S. Appl. No. 10/750,052, filed Dec. 30, 2003, Method and System to Adjust a Seller Fixed Price Offer.

U.S. Appl. No. 10/733,700, filed Dec. 11, 2003, Reverse Auction With Interest Rate Bidding.

* cited by examiner

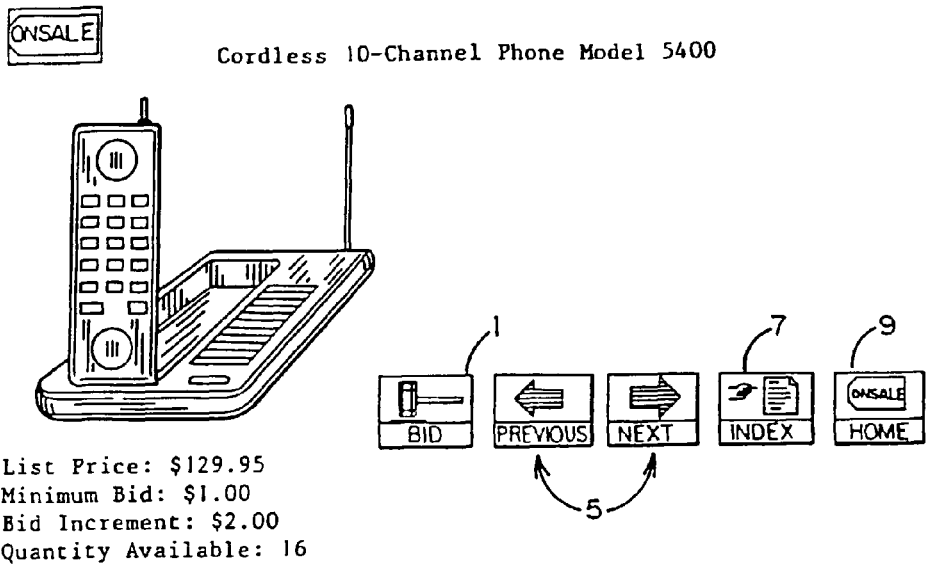

List Price: $129.95
Minimum Bid: $1.00
Bid Increment: $2.00
Quantity Available: 16

Auction closes on Fri Mar 29, 1996 1:00 PST.
Sales Format: <u>Dutch Auction</u>

The current high bidders are:

☐ NY of Reno, NV, Tue Mar 26, 3:27 pm ($25.00, 1)
☐ PM of Petersburg, VA, Tue Mar 26, 4:18 pm ($19.00, 1)
☐ NA of Corinth, TX, Tue Mar 26, 3:43 ($17.00, 1): "FOR THE WIFE"
☐ MN of Grand Prairie, TX, Tue Mar 26, 4:24 pm ($17.00, 1)
☐ RD of Cambridge, MA, Tue Mar 26, 2:43 ($15.00, 1)
☐ BC of St Laurent, PQ, Tue Mar 26, 2:52 pm ($15.00, 1)
☐ JF of Scranton, PA, Tue Mar 26, 2:59 pm ($15.00, 1)
☐ CC of Evansville, IN, Tue Mar 26, 3:01 pm ($15.00, 1)
☐ DP of Columbia, SC, Tue Mar 26, 3:12 pm ($15.00, 2)
☐ LR of Gainesville, FL, Tue Mar 26, 3:40 pm ($15.00, 1)
☐ RR of Washington, NC, Tue Mar 26, 3:15 pm ($13.00, 1)
☐ FW of University Park, PA, Tue Mar 26, 4:29 ($9.00, 1)
☐ DB of Evansville, IN, Tue Mar 26, 2:45 pm ($5.00, 1)
☐ SK of Goshen, KY, Tue Mar 26, 2:59 pm ($5.00, 2 out of 16)

Item #1918.

This Factory Reconditioned Cordless Phone Model 5400 Features:

☐ Clarity Plus, circuitry for virtually static-free reception
☐ 10-Channel selection
☐ 9-Number memory
☐ Lighted Dial
☐ Handset holds charge for up to 7 days
☐ Available in Two-tone Gray

FIG. 2

 Cordless 10-Channel Phone Model 5400

NOTICE: It is a violation of law to make bids in a false name or with an invalid credit card, even if the software initially accepts such a bid. Please be aware that even if you do not give us your real name, your web browser transmits a unique internet address to us, which can be used by law enforcement officials to identify you.

Minimum Bid: $1.00
Bid increment: $2.00

Bid (price not to exceed):
              Quantity:

The quantity you request may not always be available. Click here if you are not willing to accept a reduced quantity. ☐

Applicable sales tax, if any, will be added to your order.

If you enter your ONSALE account number, you only need to enter your first name (for security) in the Shipping Address area below.

Account Number:  (Optional)
     Shipping Address:
           First Name:
            Last Name:
              Streel1:
              Street2:
                 City:
       State/Province:
             Zip Code:
              Country:
        Email Address:
        Daytime Phone:
      Nighttime Phone:
                  FAX:

Your credit card number is required to quarantee your bid. Your card will not be charged unless your bid is successful. Only Visa and MasterCard cards are accepted.

Credit Card #:
      Expiration Date:  Month (e.g. "07")   Year (Optional) Credit card billing address if different from shipping
                      address:

Name as on Card:
              Street1:
              Street2:
                 City:
       State/Province:
             Zip Code:
              Country:

(Optional) You can enter a comment for display on screen with your bid.
              Comment:
Click here if you do not want ONSALE to keep you informed of current high bids via electronic mail. ☐   2⟶[PLACE BID]  [CLEAR FORM]

FIG. 3

METHOD AND SYSTEM FOR PROVIDING SIMULTANEOUS ON-LINE AUCTIONS

CROSS-REFERENCE TO RELATED APPLICATIONS

This application is a continuation of pending U.S. application Ser. No. 09/706,849, filed Nov. 7, 2000, which is a continuation of U.S. application Ser. No. 08/624,259, now issued U.S. Pat. No. 6,243,691, filed Mar. 29, 1996.

This application is related to copending patent application Ser. No. 10/316,296, entitled "Method and System for Offering an Item for Sale Using a User-Selectable Bid Indicia", filed Dec. 10, 2002; patent application Ser. No. 10/316,292, entitled "Method and System for Automatically Adjusting a Posted Selling Price", filed Dec. 10, 2002; patent application Ser. No. 10/316,325, entitled "Method and System for Performing a Bid Quantity Adjustment", filed Dec. 10, 2002; patent application Ser. No. 10/316,326, entitled "Method and System for Validating a Bid", filed Dec. 10, 2002; patent application Ser. No. 10/318,676, entitled "Method and System for Performing a Buy or Bid Auction", filed Dec. 13, 2002; patent application Ser. No. 10/319,868, entitled "Method and System for Providing Status Updates", filed Dec. 13, 2002; patent application Ser. No. 10/319,869, entitled "Method and System for Adjusting a Close Time of an Auction", filed Dec. 13, 2002; patent application Ser. No. 10/316,324, entitled "Method and System for Performing a Progressive Auction", filed Dec. 10, 2002; patent application Ser. No. 10/316,297, entitled "Method and System for Performing Proxy Bidding", filed Dec. 10, 2002; and patent application Ser. No. 10/316,293, entitled "Method and System for Updating Information On a Merchandise Catalog Page", filed Dec. 10, 2002, each commonly assigned with the present invention.

BACKGROUND OF THE INVENTION

1. Field of the Invention

The present invention relates generally to electronic commerce and more particularly to conducting an interactive auction over an electronic network.

2. Background of the Invention

Auctions usually take the form of a physical gathering of bidders assembled together within an auction house. Auctions presenting more valuable, collectible merchandise, such as art, coins, and antiques, are often preceded by preparation of a catalog of merchandise, circulated to interested parties in advance of the gathering at the auction house, where bidding by those physically present will take place. For auctions of more mundane items, such as household possessions, estate sales and the like, the interested bidders simply appear at the appointed time and place and bid on merchandise in which they are interested.

SUMMARY OF THE INVENTION

A method and system for providing simultaneous online auctions includes automatically auctioning a first item and a second item during a common time period via an electronic auction system. Bids for both of the first item and the second item are automatically received at the electronic auction system during the common time period.

A primary advantage of this system is that it results in greater prices for merchants as well as broader distribution of their products. By incorporating an auction format which is available to a wide audience via electronic means, the inventive system and method results in more bidders, greater demand, and hence higher prices for the seller. And because this electronic system reaches a geographically diverse audience, merchants' product lines become visible in areas where their products are not normally distributed or advertised, resulting in increased sales volume without increased marketing expense. As the network grows, business grows. Furthermore, the electronic auction system is automatic and does not require a human auctioneer, thereby allowing many individual items to be auctioned during the same time period and providing a decrease in costs associated with running an auction. Indeed, it would not be possible to operate an equivalent twenty-four hour per day, seven day per week auction with potentially hundreds or even thousands of individual items and millions of potential bidders without such an inventive electronic auction method and system.

BRIEF DESCRIPTION OF THE DRAWINGS

An exemplary embodiment of the present invention is illustrated in the accompanying drawings in which like references include similar elements and in which:

FIG. 2 illustrates an exemplary merchandise catalog page offering an item for sale via electronic auction on the Internet's World Wide Web;

FIG. 3 depicts an exemplary bid form for bidding on an auction item;

DETAILED DESCRIPTION

Figure 1:
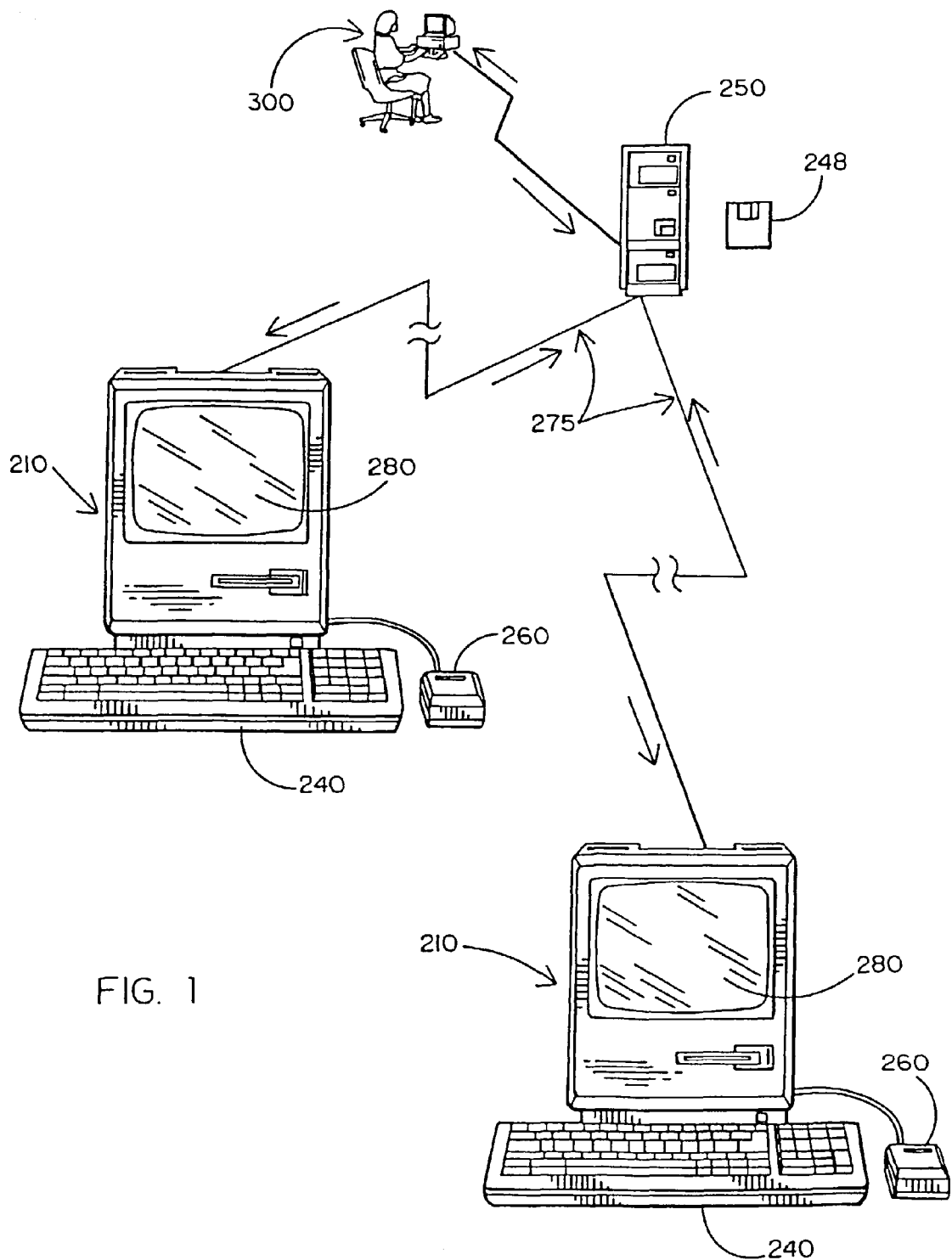
FIG. 1 illustrates an exemplary computer environment for implementing the system and method of the present invention.

A method and system for providing simultaneous on-line auctions are disclosed. In the following description, for the purposes of explanation, numerous specific details are set forth in order to provide a thorough understanding of the present invention. It will be evident, however, to one skilled in the art that the present invention may be practiced without these specific details.

An exemplary system includes a database for maintaining descriptions of the merchandise for auction, the bids, and other relevant information in a commercially available database system. Database searches may be performed periodically to check for new items to be made visible to potential bidders. Such periodic searching allows an individual charged with maintaining this system to load relevant information into the database at his or her leisure. Once the database is loaded with information about the item and the item is scheduled for presentation to potential bidders, the system takes the merchandise information and creates a human readable catalog page for a viewing over a public network such as the Internet's World Wide Web. Bidders are then able to view the new item for auction and to place their bids. These catalog pages preferably contain the current high bid, bid increment, quantity available, merchandise description, and picture of the item.

Upon accessing a public network and seeing an item's catalog page, the bidder may press a button on the catalog page or take some similar action which causes a bid form to be displayed on the screen. The bidder then enters the information necessary to place a bid, such as their name and address, bid amount, payment information, etc., and then presses a bid submission button, or takes a similar action which sends the bid to the system.

The system receives the electronic bid information and places it in the bid database. Because this new bid will, in general, be a bid for a higher amount than was last bid by another party, the system will regenerate the item's catalog page. This updated catalog page will then show the new high bid to any prospective bidders who later access that catalog page.

Because most bidders will not, in general, be accessing the network and viewing the merchandise catalog pages as they are updated with new high bids, the system may send electronic mail notifications to bidders who have been outbid by the just-placed bid. These electronic mail notification messages may contain the relevant merchandise information, the current high bid, the bid increment, etc., and encourage the bidder to submit a new and higher bid to outbid the current high bidder. These electronic mail notification messages allow the bidder to enter a new bid by replying to the electronic mail message and sending it back to the system.

Upon receiving a new or revised bid via electronic mail, the system follows the same set of actions as when the bidder places a bid using the electronic bid form when viewing a merchandise catalog page, namely, the system extracts the relevant bid information from the electronic mail message, deposits this information in the bid database, and then updates the merchandise catalog page as appropriate. Such an electronic mail message bid may further cause a new round of electronic mail notifications to go out to the recently outbid bidders.

This process may continue until the system detects that the item is scheduled to be closed for further bidding or another closing trigger is detected. At this point, the system closes the auction by updating the merchandise catalog page with the final winning bid information and by sending electronic mail notifications to both the winning bidder or bidders and the losing bidder or bidders.

The exemplary embodiment of the present invention provides an electronic auction method and system for presenting merchandise for sale at auction to customers over an electronic network, such as the Internet's World Wide Web. Potential customers are presented with a series of descriptive merchandise catalog pages through which they may navigate to find items (lots) of interest. Upon finding a lot of interest, customers may click a button on screen to display a form for placing a bid on the lot. After submitting this bid, the electronic auction system records the bid and updates the lot's merchandise catalog page to show the current high bid or bids and to whom such bids are attributable. When the auction is closed, after a period of no bidding activity, at a predetermined time, or when a desired sales volume is reached, the electronic auction system notifies the winning and losing bidders by electronic mail and posts a list of the winning bidders on the closed lot's merchandise catalog page.

The exemplary embodiment of the present invention may be implemented as a computer program 248 running on a central server host computer 250, shown in FIG. 1, attached to a wide area network 275 accessible by many potential customers through remote terminals 210. An exemplary network for implementing the present invention is the Internet which is accessible by a significant percentage of the world population, although the network may also be a local area or limited area accessible network. Potential customers are presented at screen 280 with merchandise catalog pages, such as the one shown in FIG. 2, generated by merchandise catalog page generator 25 shown in FIG. 4. Each merchandise catalog page includes several action buttons 5 that allow the customer to move from catalog page to catalog page and to place bids using keyboard 240 and pointing device 260. The user may call up an index of available merchandise by pressing button 7 or may return to a central home page by pressing button 9.

By pressing bid button 1 in FIG. 2, the customer is presented with a bid form such as the one shown in FIG. 3. The customer fills out the required information in the bid form and presses "Place Bid" button 2 to send the bid to the electronic auction system for processing. Other equivalent means for submitting a bid could be used, as understood by those skilled in the art to which the present invention pertains.

Figure 4:
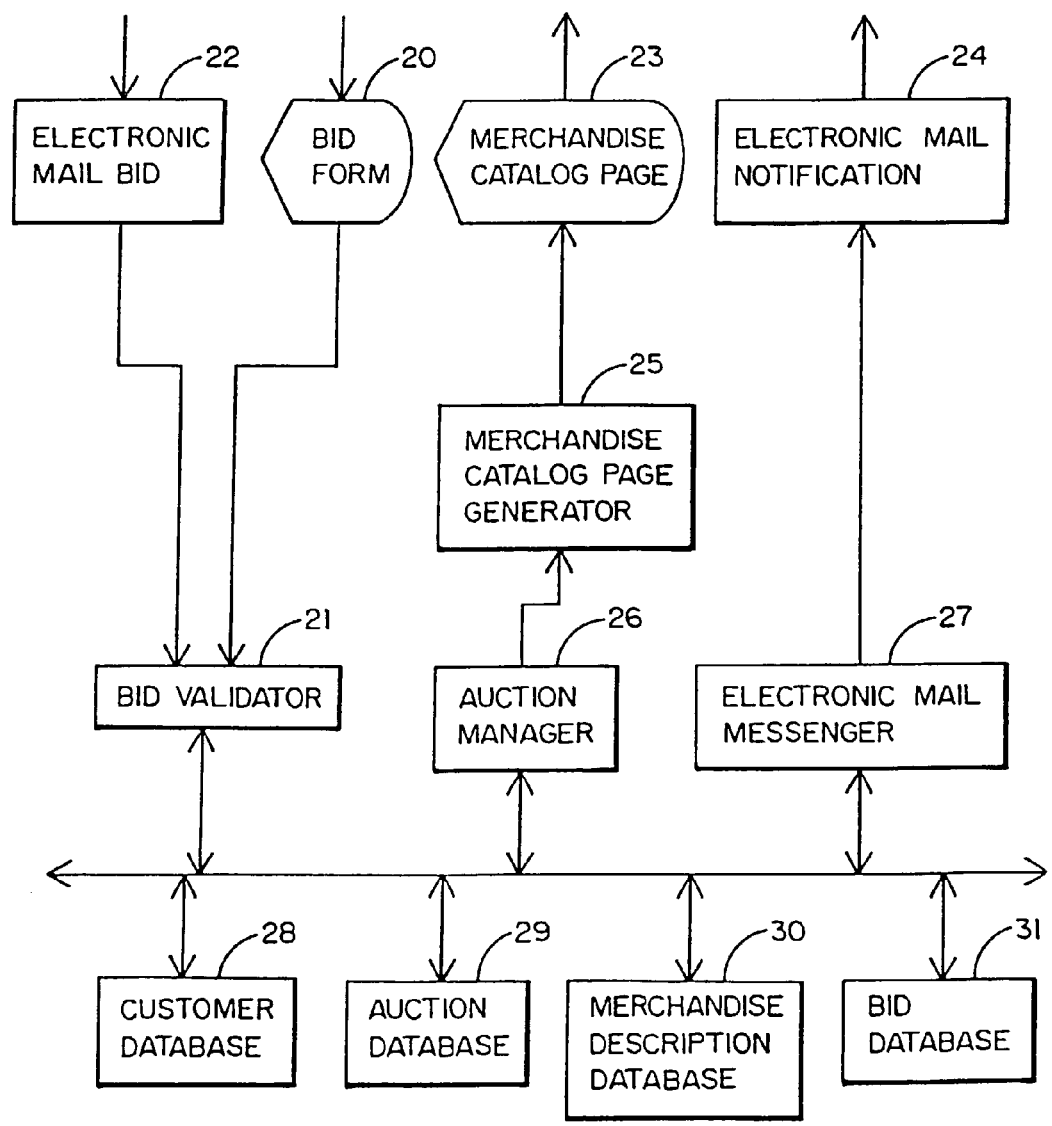
FIG. 4 is a block diagram of components illustrating an exemplary embodiment of the present invention.

FIG. 4 illustrates a high level block diagram of the electronic auction system according to one embodiment of the present invention. As shown, information from bid form 20 is received by the electronic auction system where it is processed by bid validator 21. Bid validator 21 examines the bid information entered by the customer on bid form 20 to ensure that the bid is properly formatted, all necessary data is present, and the data values entered look credible. Exemplary functions of bid validator 21 include verifying credit card information entered by the customer, checking that a complete name and shipping address has been entered, that the proper state abbreviation and zip code have been entered, that an appropriate bid amount has been entered, and that a telephone or facsimile number has been entered. Once the bid information has been validated, the bid validator 21 places the bid in bid database 31.

Auction manager 26 may frequently query the bid database 31 to see if any new bids have been placed. If new bids are found during the query, then auction manager 26 calculates the current high bidder or bidders and instructs merchandise catalog page generator 25 to regenerate a catalog page with the updated bid information.

Auction manager 26 is also responsible for opening and closing auctions. This entails making merchandise lots available for bidding by customers and disabling their associated buy or bid features on the merchandise pages that have been posted to potential bidders but have closed. When auction manager 26 determines that a new lot should be opened for bidding or an available lot should be closed, it instructs merchandise catalog page generator 25 to create or update the merchandise catalog pages for the appropriate lots.

Electronic mail messenger 27 frequently queries bid database 31 for bids recently marked by auction manager 26 as having been outbid or as having won an item in a recently closed auction. If such bids are found, the electronic mail messenger 27 formats an appropriate electronic mail notification message 24 and sends this message to the customer.

Many customers read their electronic mail throughout the day, making this a convenient mechanism for keeping them informed about the status of merchandise on which they are actively bidding. Bidders may reply to an electronic mail notification message 24 informing them that they have been outbid by including an increased bid amount in the reply message. An electronic mail bid 22 sent in reply to the notification is received by the electronic auction system and processed by bid validator 21 as described above.

Figure 5:
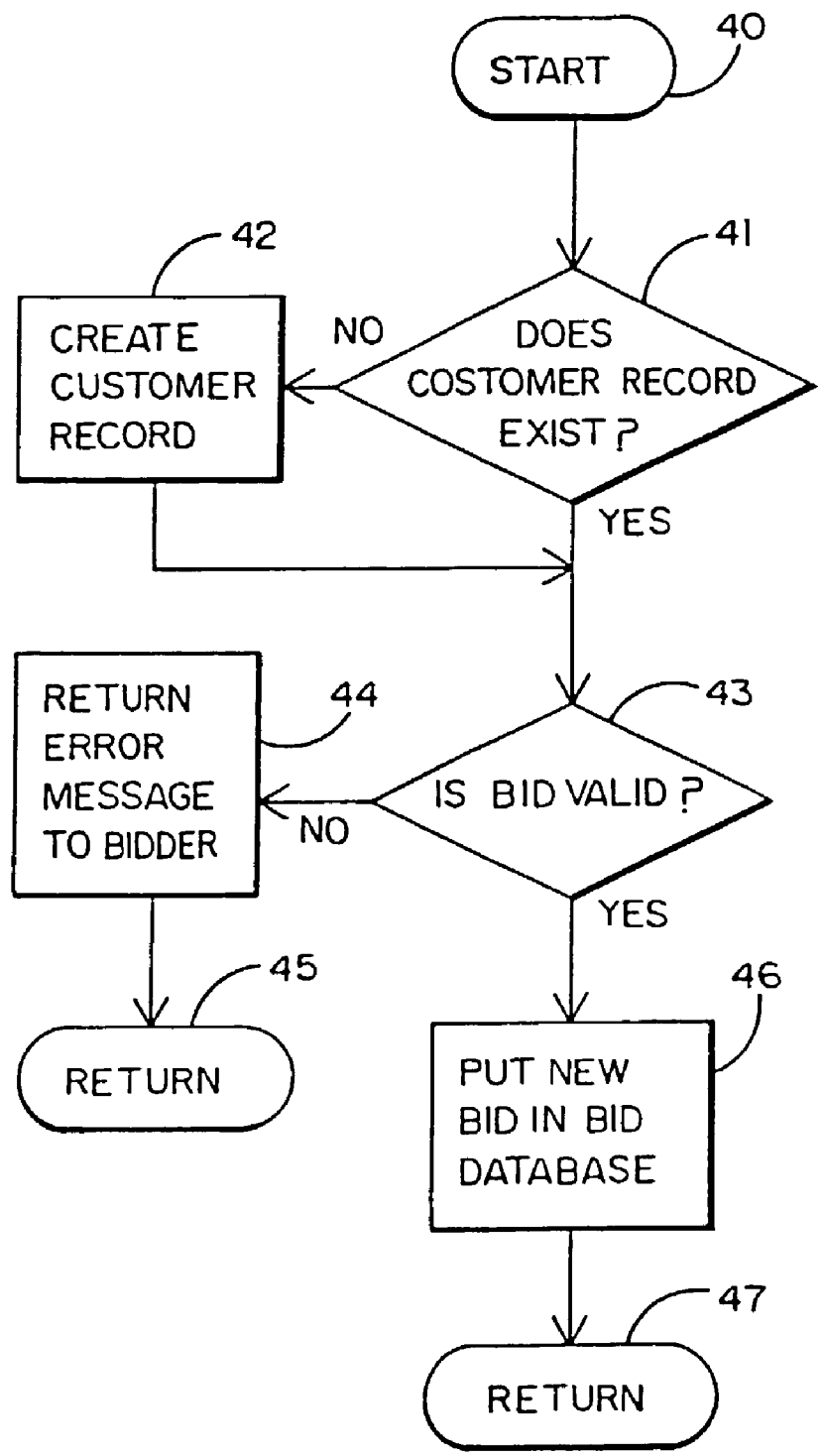
FIG. 5 is a flowchart illustrating an exemplary bid validator and its method of operation.

FIG. 5 illustrates in detail an exemplary procedure of bid validation as accomplished by bid validator 21 shown in FIG. 4. A bid is received by bid validator 21 and the customer is looked up at step 41 in customer database 28. If no customer record exists for the customer then a new customer record is created 42 and placed in customer database 28. From there, the bid information is validated 43 as previously described. If the bid data includes one or more errors, then an error message is returned 44 to the bidder, for example in the form of a well-formatted page posted across the network, itemizing the errors found in the bid. If the bid is valid, as found in step 43, then the bid is placed 46 in bid database 31.

Figure 6:
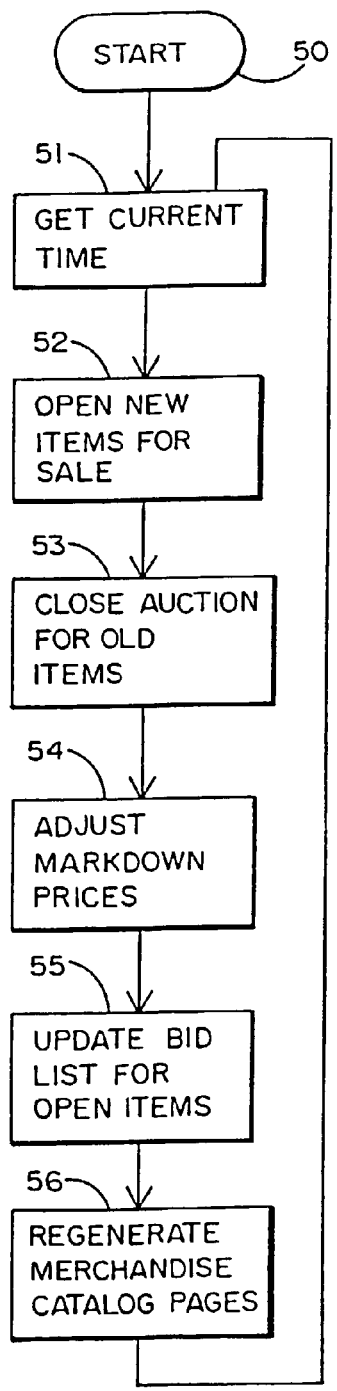
FIG. 6 is a flowchart illustrating an exemplary auction manager and its method of operation.

FIG. 6 provides a detailed illustration of exemplary procedures carried out by auction manager 26. Auction manager 26 may be a continuously running system that begins by getting the current time as at step 51. It then checks to see if any new items for sale are to be opened by examining the merchandise database to see if any new merchandise items are scheduled to be made available for bidding by customers at or before the current time. Operator 300, or some automated substitute, may upload merchandise and scheduling information to the database, as shown in FIG. 1. If new merchandise items are scheduled for posting, these items are opened for bidding 52. The auction manager then examines the merchandise database to see if any merchandise items are scheduled to be closed from customer bidding. If so, these items are closed from bidding 53. Auction manager 26 then examines the merchandise database to see if any merchandise items posted with a price markdown feature are scheduled to have their prices adjusted. If so, the prices of these items are adjusted 54 in accordance with the particular item's price adjustment parameters. Such parameters may include bidding activity over time, amount of bids received, and number of items bid for. Auction manager 26 then updates 55 the bid list for open items by recalculating the current high bidder list and regenerating the merchandise catalog pages 56 to reflect these new bids. This step is more fully described below with reference to FIG. 7.

Figure 7:
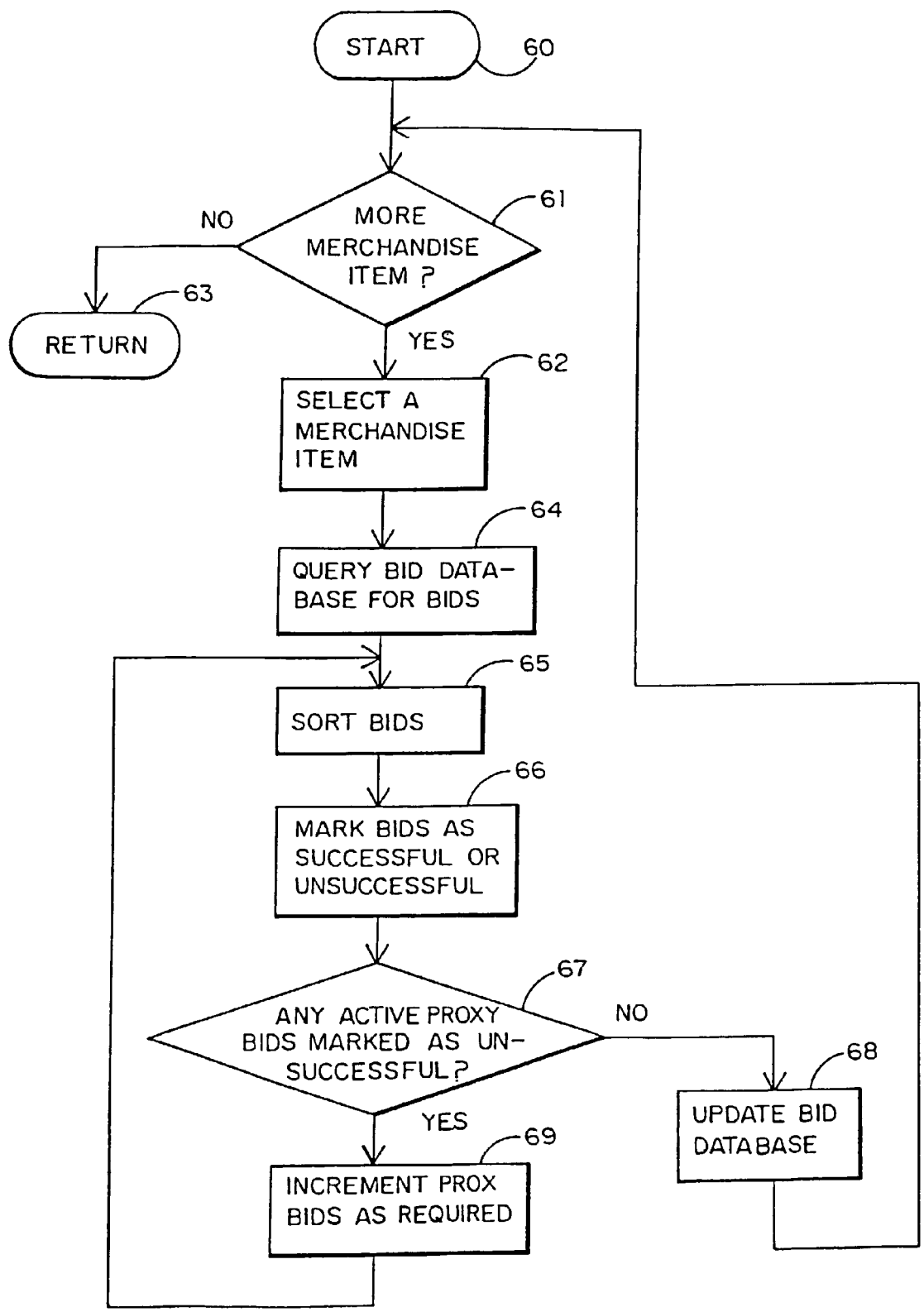
FIG. 7 is a flowchart illustrating an exemplary bid manager and its method of operation.

FIG. 7 illustrates exemplary procedures carried out by the bid manager in updating the bid list for open items 55 as shown in FIG. 6. The bid manager begins by checking 61 if there are more merchandise items to be processed. If such items are found, the bid manager selects 62 a merchandise item to process and queries 64 the bid database for bids for this item. These bids are sorted 65 using a variety of different priority ranking schemes depending upon the auction method and system used for the particular merchandise item, as described in more detail below. Then, the bids are marked 66 as either successful or unsuccessful depending upon the bid price of the respective bids and the quantity of the item being bid on relative to the quantity of the item being auctioned. In an exemplary embodiment, a quantity of an item may be put up for auction, and individual bidders may bid on any quantity of the item desired, up to the quantity of the item being auctioned.

The bid manager then checks 67 to see if there are any active proxy bids marked as unsuccessful. A proxy bid is a special bid type that allows auction manager 26 to automatically bid on the bidder's behalf up to a limited amount established by the bidder when his or her initial bid is placed. The auction manager will increase the bid as necessary up to the limit amount. This feature allows the customer to get the lowest possible price without exceeding a limit preferably established when the bid is entered. If there are active proxy bids marked as unsuccessful, then the bid manager increments 69 the proxy bids by a preset bid increment. This procedure of sorting 65 marking 66 bids and incrementing 69 the proxy bids as required continues until either there are no additional proxy bids marked as unsuccessful or the proxy limits have been reached on the proxy bids. At this point, bid database 31 is updated 68 with the marked bids. This process is then repeated for each merchandise lot open at the current time for bidding by customers.

Figure 8:
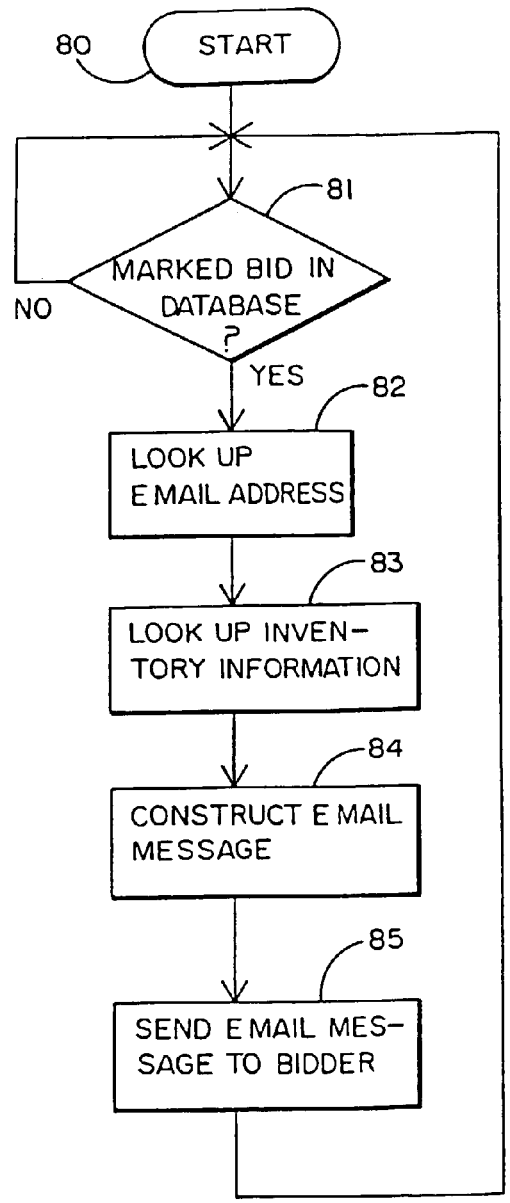
FIG. 8 is a flowchart illustrating an exemplary electronic mail messenger and its method of operation.

FIG. 8 illustrates exemplary procedures carried out by electronic mail messenger 27 which notifies bidders when they have been outbid. When marked bids are updated in bid database 31 as shown in FIG. 7, electronic mail messenger 27 detects 81 the presence of these marked bids and then looks up 82 the customer's electronic mail address and looks up 83 inventory information on the item desired by the bidder. With this information, electronic mail messenger 27 constructs 84 an electronic mail message informing the bidder that he or she has been outbid. Once constructed, the electronic mail notification message 24 is sent to the bidder as shown at step 85.

Various components of the electronic auction system can communicate between themselves in a variety of ways. In an exemplary embodiment, bid validator 21, auction manager 26, and electronic mail messenger 27 communicate by adding, marking, and updating records in the various databases. Each of these components periodically checks at least one of the databases to see if anything relevant to their respective functions has changed and take action accordingly. However, the components could send direct messages between themselves or call each other by means of program subroutines to signal important events that would require one or the other component to update its state.

A variety of different auction formats may be implemented using the basic technique described above. The simplest is the "Standard Auction" format, whereby the electronic auction system awards the merchandise to the top bidder or bidders in accordance with their bids once bidding has stopped. Using this format, if there is a plurality of a specific item, the system awards the merchandise to the top bidders. Bidders may bid on more than one unit, and different successful bidders will, in general, pay different prices for an item.

Figure 9:
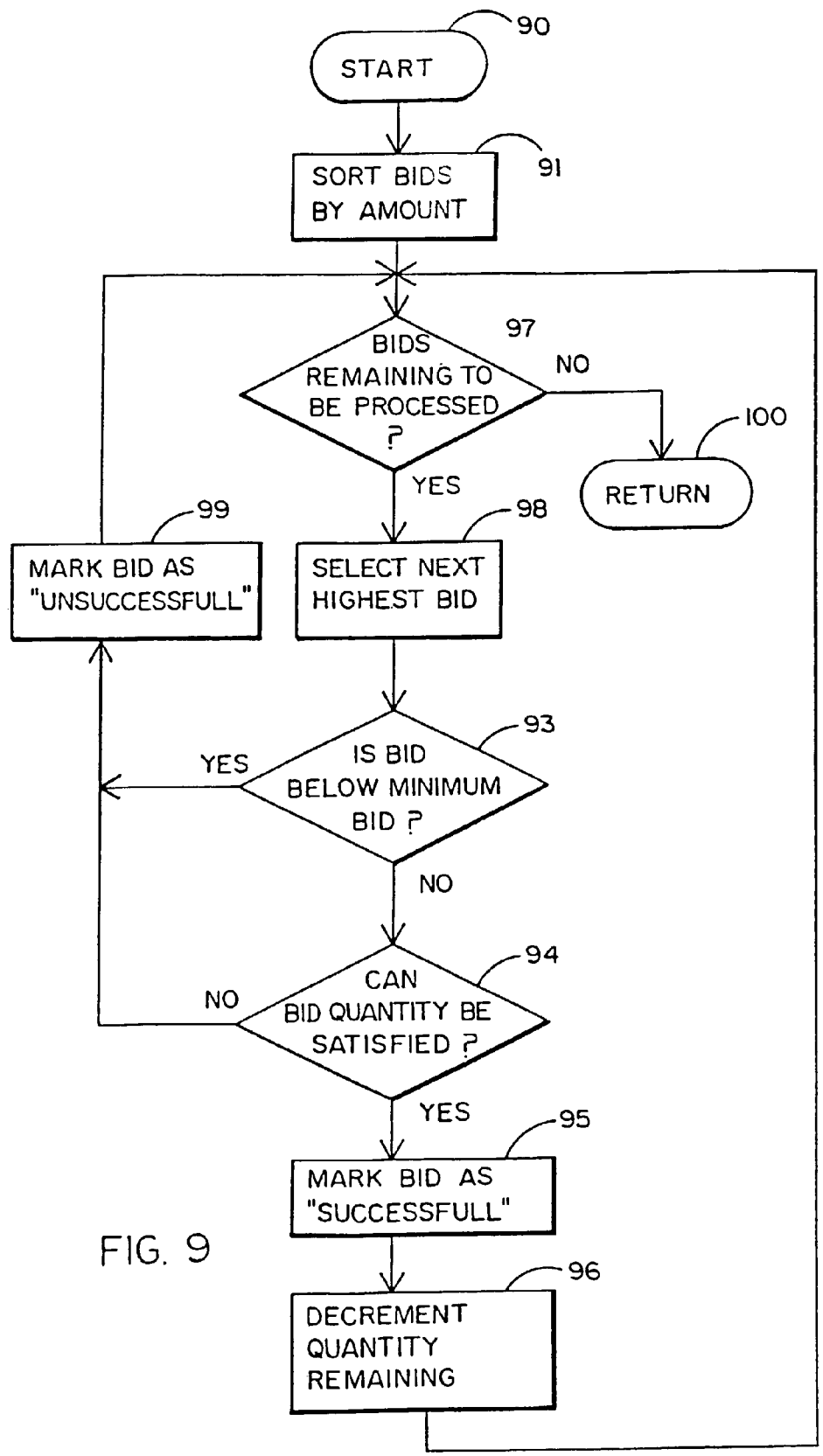
FIG. 9 is a flowchart illustrating an exemplary standard auction format and its method of operation.

FIG. 9 illustrates the exemplary Standard Auction format where bid manager 55, shown in FIG. 6, determines which bids to mark as successful or unsuccessful, as shown in step 66 in FIG. 7. Bid manager 55 begins by sorting 91 the bids by amount of the bid. If there are bids remaining to be processed, determined at step 97, the highest remaining bid is selected 98 to be checked. If the bid is below the minimum bid allowed for the particular merchandise item, as determined at step 93, the bid is marked 99 as unsuccessful. If not, the bid is checked 94 to see if the quantity may be satisfied. A bid may be satisfied if the quantity of the item bid upon is available. This information is available from auction database 29. If not, then the bid is marked 99 as unsuccessful. Optionally, the system could ask the user if a lesser quantity than bid upon will be acceptable, as shown in FIG. 2 at box 310. If the bid quantity can be satisfied, as determined at step 94, then the bid is marked 95 as successful and the item quantity remaining, recorded in auction database 29, is decremented 96 by the bid quantity. After the quantity remaining is decremented 96, and if, as determined at step 97, there are still bids remaining to be marked, the next highest bid is selected 98 and the steps of FIG. 9 are repeated.

The exemplary electronic auction system of the present invention also provides a "Dutch Auction" format, wherein the electronic auction system awards the merchandise to all of the top bidders for whom there is available inventory at the price bid by the lowest successful bidder. This format may be preferred by customers for being the most fair when a plurality of a specific item is being auctioned. As with all bidding, there will be a range of bids submitted. In the Dutch Auction format, the highest bidders are awarded the merchandise but at the same price for all successful bidders, the price bid by the lowest successful bidder.

Figure 10:
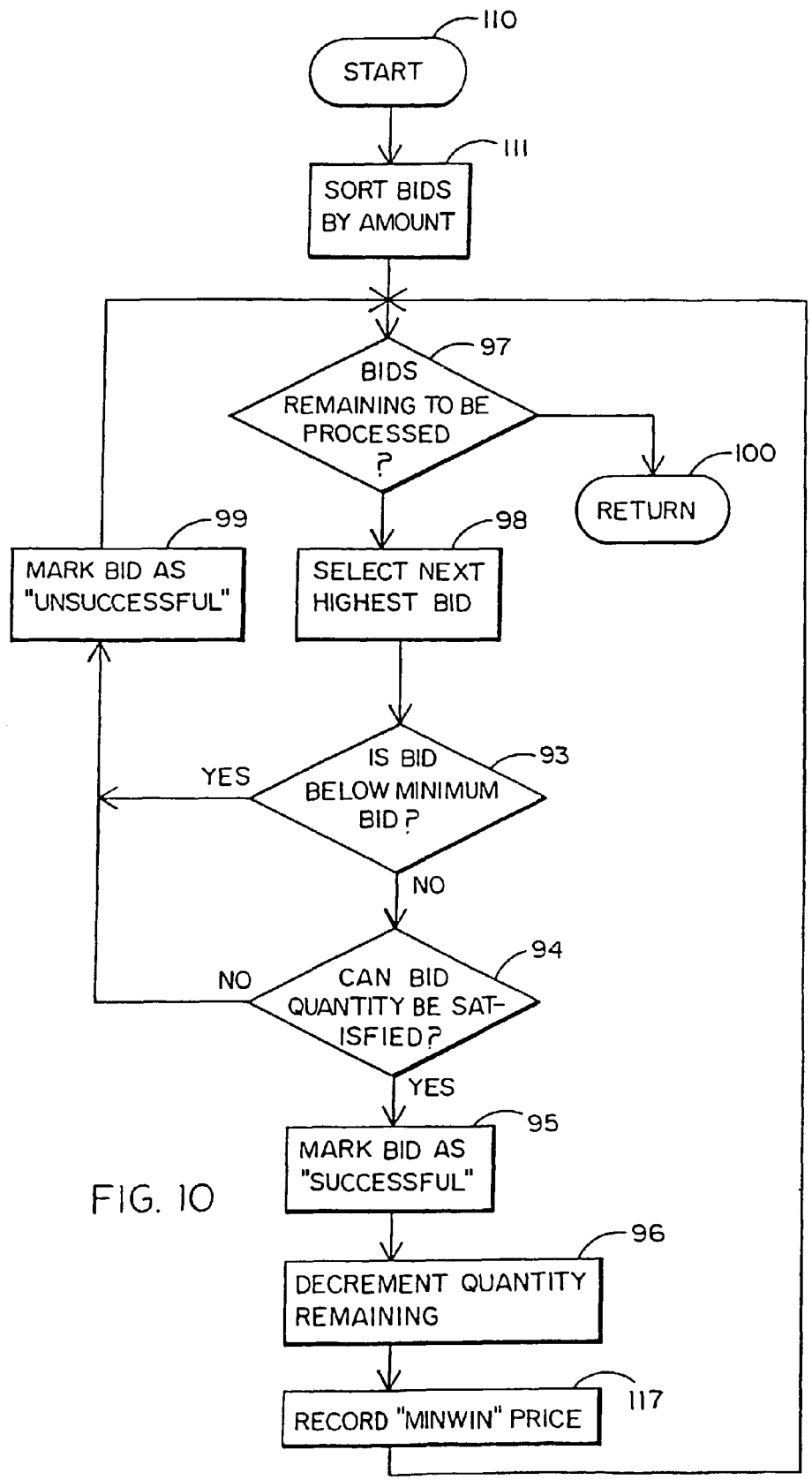
FIG. 10 is a flowchart illustrating an exemplary Dutch auction format and its method of operation.

FIG. 10 illustrates the exemplary Dutch Auction format whereby bid manager 55 shown in FIG. 6 determines which bids to mark 66 as successful or unsuccessful, as shown in FIG. 7. Bid manager 55 begins by sorting 111 the bids by amount of the bid. If there are bids remaining to be processed, as determined at step 97 the highest bid is selected 98 to be checked. If the bid is below the minimum bid allowed for the particular merchandise item, as determined at step 93, the bid is marked as unsuccessful 99. If not, the bid is checked 94 to see if the bid quantity may be satisfied. If the bid cannot be satisfied, then the bid is marked as unsuccessful at step 99. If the bid quantity can be satisfied, then the bid is marked as successful at step 95 and the item quantity remaining is decremented 96 by the bid quantity. At this time the MinWin price is recorded 117. The MinWin price is the price above which a new bidder must bid in order to be successful in the Dutch Auction format were the auction to close at that moment. The MinWin price is, in general, the bid price of the lowest bid that is marked as successful. After recording the MinWin price at step 117, where there are still bids remaining to be marked, as determined at step 97, the next highest bid is selected 98 and the steps of FIG. 10 are repeated.

The exemplary electronic auction system may also include a "Progressive Auction" format, wherein the electronic auction system awards the merchandise to the top bidders based on price bid. As with the Dutch Auction format, the highest price bids are awarded the merchandise up to the quantity available of the item being auctioned. However, unlike the Dutch Auction format, the system awards the merchandise to the successful bidders at different prices depending on the quantity bid. In the exemplary embodiment, a successful bidder for a single unit of an item is awarded the item at the price of the lowest successful bid for a single unit of the item. A successful bidder for a higher quantity of the same item is awarded the item at the price of the lowest successful bid at that quantity or any lower quantity. For example, a successful bidder for a quantity of five would pay the lowest price for any successful bid for quantity one through five of the item. The price paid for a given quantity is termed the "MinWin" price for that quantity. The Progressive Auction format ensures that successful bidders for a quantity of an item pay the lowest price paid by any other successful bidder at that quantity level or below. Use of this format leads to lower prices for those who successfully bid on larger quantities of an item, provides an impetus for volume buying, and therefore leads to greater sales volume.

Figure 11:
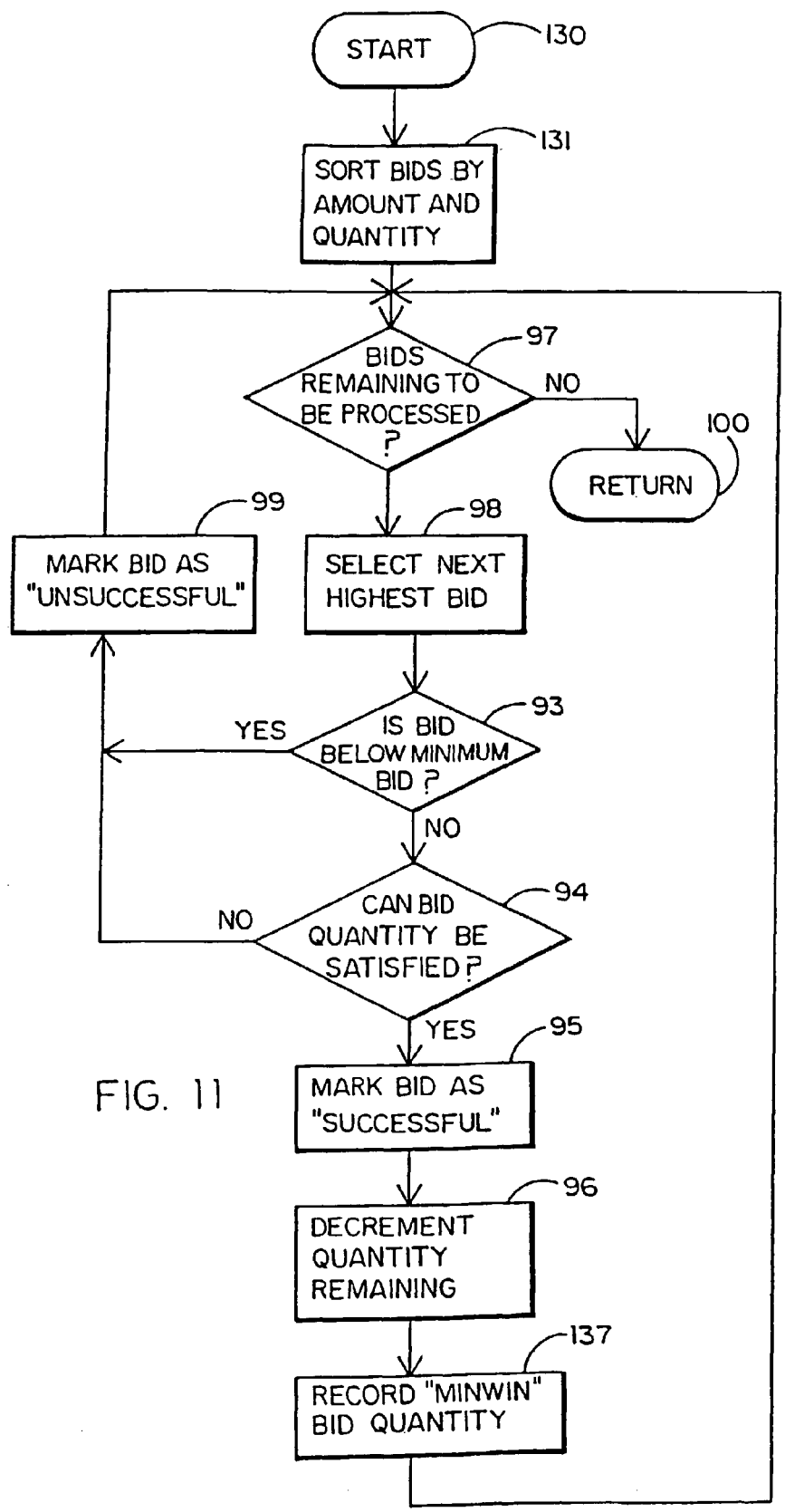
FIG. 11 is a flowchart illustrating an exemplary progressive auction format and its method of operation.

FIG. 11 illustrates the exemplary Progressive Auction format, wherein bid manager 55 shown in FIG. 6 determines which bids to mark as successful or unsuccessful 66 as shown in FIG. 7. Bid manager 55 begins by sorting 131 the bids by amount of the bid. If there are bids remaining to be processed, as determined at step 97, the highest bid is selected 98 to be checked. If the bid is determined to be below the minimum bid allowed for the particular merchandise item at step 93, the bid is marked as unsuccessful 99. If not, the bid is checked at step 94 to see if the bid quantity can be satisfied. If not, then the bid is marked 99 as unsuccessful. If the bid quantity is checked and found to be satisfied at step 94, then the bid is marked as successful 95 and the item quantity remaining is decremented 96 by the bid quantity. The MinWin price is then recorded 137. The MinWin price is the price above which a new bidder must bid in order to be successful in the Progressive Auction format were the auction to close at that moment. The MinWin price is, in general, the bid price of the lowest bid at the current bid quantity or lower that is marked as successful. After recording the MinWin price 137, if there are still bids remaining to be marked, the next highest bid is selected 98 and the steps of FIG. 11 are repeated.

The exemplary electronic auction system may also include a "Buy Or Bid" format wherein the electronic auction system awards merchandise to bidders who place bids at or above a posted selling price. The item remains for sale until the available quantity is purchased. Bids that are below the posted selling price are maintained in reserve by the system. If a certain sales volume is not achieved in a specified period of time, the electronic auction system automatically reduces the price by a predetermined amount or a predetermined percentage of the price and updates the merchandise catalog page accordingly. The lower price may be at or below some of the bids already in the bid database. If such bids are present, they are then converted to orders and the quantity available is reduced accordingly. Similarly, if a certain sales volume is exceeded in a specified period of time, the electronic auction system automatically increases the price by a set amount or by a set percentage of the price and updates the merchandise page accordingly. These automatic price changes allow the seller to respond quickly to market conditions while keeping the price of the merchandise as high as possible to the sellers benefit.

Figure 12:
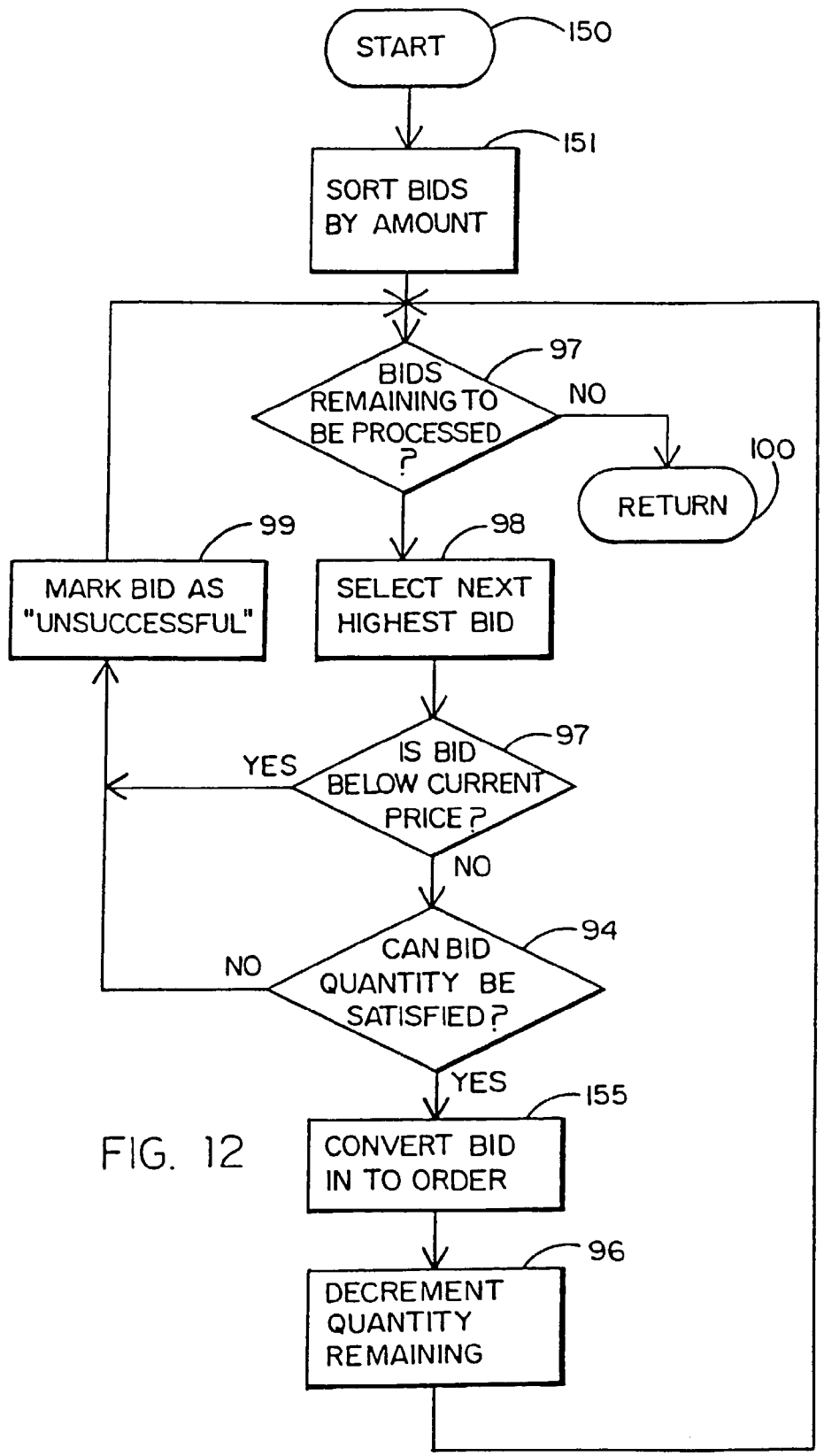
FIG. 12 is a flowchart illustrating an exemplary buy or bid sale format and its method of operation.

FIG. 12 illustrates the exemplary Buy Or Bid format whereby bid manager 55, as shown in FIG. 6, determines which bids to mark as successful or unsuccessful 66, as shown in FIG. 7. Bid manager 55 begins by sorting 151 the bids by amount. If there are bids remaining to be processed, as determined at step 97, the highest bid is selected 98 to be checked. If the bid is below the current price of the merchandise item, as determined at 93, then the bid is marked 99 unsuccessful. If the bid is not below the current price, as determined at 93, then the bid is checked 94 to see if the bid quantity can be satisfied. If not, the bid is marked as unsuccessful 99. If the bid quantity can be satisfied, then the bid is converted into an order 155 at the current price of the item and the item's quantity remaining is decremented 96. The bids remaining to be processed, as determined at 97, are then checked and the steps of FIG. 11 are repeated. From time to time, the current price of the merchandise item may be raised or lowered either by manual input from an operator 300 as shown in FIG. 1 or by automatically using the "markdown" feature described below with reference to FIG. 14.

Figures 13, 14:
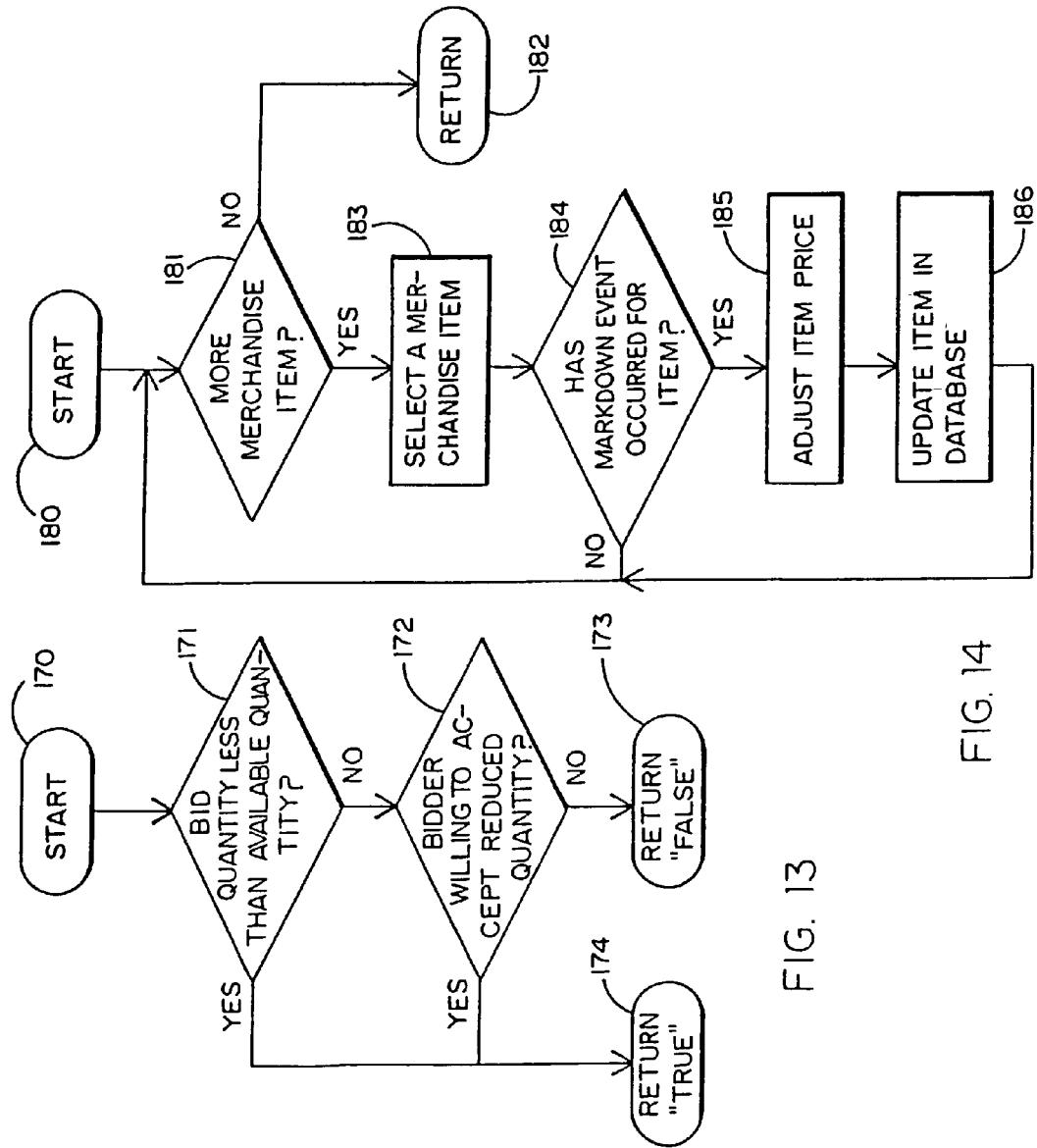
FIG. 13 is a flowchart illustrating an exemplary bid quantity determination and its method of operation.
FIG. 14 is a flowchart illustrating an exemplary markdown price adjustment and its method of operation.

FIG. 13 illustrates in more detail the step of determining if the bid quantity can be satisfied 94. If the bid quantity is determined to be less than the available quantity of the merchandise item at step 171, then the test is found satisfied at step 174. If not, then the bid is checked at 172 to see if the bidder is willing to accept a reduced quantity. When placing a bid, the bidder indicates its willingness to accept a partial quantity in the event that an insufficient quantity of the item is available to satisfy the bid if successful. If the bidder is found willing to accept a reduced quantity at 172, then the test is found satisfied at 174. If not, the test fails at 173 and the bid is marked as unsuccessful at, for example, 99 in FIG. 9.

The exemplary electronic auction system also includes a "markdown" feature, wherein the electronic auction system awards merchandise to buyers who place orders at the currently posted selling price. The item remains on sale until the available quantity is purchased. If a certain sales volume is not achieved in a specified period of time, the electronic auction system automatically reduces the price by a set amount or a set percentage and updates the merchandise catalog page accordingly. This lower price encourages buyers to take advantage of the new price. If a certain sales volume is exceeded in a specified period of time, the electronic auction system automatically increases the price by a set amount or a set percentage and updates the merchandise page accordingly. These automatic price changes allow the system to respond to market conditions while keeping the prices of the merchandise as high as possible to the seller's benefit.

FIG. 14 illustrates the exemplary Markdown price adjustment feature whereby auction manager 26, as shown in FIG. 4, periodically adjusts 54 the sales prices or minimum bid prices, of the merchandise items according to a predetermined schedule as shown in FIG. 6. If more merchandise items are found in the merchandise database at 181, a merchandise item is selected 183 for Markdown. If a Markdown event has occurred for the item, as determined at 184, the item's price is adjusted 185 according to the schedule preset for the individual item. Alternatively, the adjustment could be relative to prices offered for the merchandise. The merchandise item is then updated 186 in the database with the new sale price or minimum bid price. The steps of FIG. 14 are then repeated for each successive merchandise item in the merchandise database.

The exemplary electronic auction system may include a "Proxy Bidding" feature that may be applied to any of the auction formats described above. FIG. 7 fully describes auction manager 26 including the Proxy Bidding feature. When Proxy Bidding is employed, a bidder places a bid for the maximum amount they are willing to pay. The electronic auction system, however, only displays the amount necessary to win the item up to the amount of the currently high proxy bids of other bidders. Typically, the currently high bids display an amount that is one bidding increment above the second highest bid or bids, although a percentage above the second highest bids may be used as well. When a new bidder places a bid that is above a currently displayed high bid, the proxy feature will, in general, cause the currently high bid to move up to an amount higher than the new bid, up to the maximum amount of the currently high bidder's proxy bid. Once a new bidder places a bid in excess of the currently high bidder's proxy bid, the new bid becomes the current high bid and the previous high bid becomes the second highest bid. This feature allows bidders to participate in the electronic auction without revealing to the other bidders the extent to which they are willing to increase their bids, while maintaining control of their maximum bid without closely monitoring the bidding. Participation is engaged in automatically on the bidder's behalf by the inventive system. The feature guarantees proxy bidders the lowest possible price up to a specified maximum without requiring frequent inquiries as to the state of the bidding.

A variety of different auction formats may be implemented in addition to those described above. The exemplary electronic auction system may, for example, also employ a "Floating Closing Time" feature whereby the auction for a particular item is automatically closed if no new bids are received within a predetermined time interval. This feature would typically be implemented in a manner similar to that used to close auctions of old items, as shown at step 53 in FIG. 6. This feature forces the bidding activity to occur within a shorter amount of time than would otherwise be achieved because bidders are aware that the item will automatically close if no new bids have been received in a timely manner. Thus, bidders have an incentive to stay active in the bidding process to avoid closure of an item before maximum, and most potentially winning, bids have been entered. The Floating Closing Time feature also allows more items to be auctioned during a period of time since each item is closed once bidding activity ceases; the bidding period is not protracted to an artificial length as is the case when an item closes at a preset date and time. The Floating Closing Time feature of the present invention may be employed either in conjunction with or independent of a fixed closing time for an item. When employed in conjunction with a fixed closing time, the auction is closed either when the preset fixed time period has expired for the item or when no bidding activity has occurred within a preset time interval. This forces the bidding to cease at a particular time in case the bidding activity becomes artificially protracted.

Thus, a method and system for providing simultaneous on-line auction are disclosed. A general description of the present invention as well as an exemplary embodiment of the present invention has been set forth above. Those skilled in the art to which the present invention pertains will recognize and be able to practice additional variations in the methods and system described which fall within the teachings of this invention. For example, although the exemplary embodiment of the present invention chooses winning bids according to monetary amount included in the bid, preference for bids may also be determined according to time of submission, quantity of merchandise bid for, total bid value, or some other combination of these characteristics. Accordingly, all such modifications and additions are deemed to be within the scope of the invention which is to be limited only by the claims appended hereto.

What is claimed is:

1. A method of operating an electronic auction system, the method including:

auctioning a first item based on a first auction format;

auctioning a lot of new items based on a second auction format; and receiving, at the electronic auction system, bids for the first item and bids for one or more items of the lot of new items, the auctioning of the first item based on the first auction format d including automatically awarding the first item based on a high bid of one or more of the bids for the first item, and the auctioning of the lot of new items based on the second auction format including, using one or more processors, accessing an electronic auction database to obtain a posted minimum selling price for the one or more items, comparing the posted minimum selling price to a first bid of the bids for the one or more items, reserving the first bid in an electronic bid database operatively coupled to the electronic auction system based on the first bid not meeting the posted minimum selling price, the reserved first bid for the one or more items to be considered as a further bid for a further one or more items of the lot of new items, for sale at an adjusted minimum selling price, automatically awarding the one or more items based on a second bid at least meeting the posted minimum selling price, accessing the electronic auction database to obtain a desired sales volume associated with the lot of new items, determining an actual sales volume associated with the lot of new items using a number of the awarded one or more items, automatically adjusting the posted minimum selling price to calculate the adjusted minimum selling price for the further one or more items based on a result of comparing the desired sales volume with the actual sales volume, and providing instructions to update a merchandise catalog page with the adjusted minimum selling price for the further one or more items.

2. The method of claim 1, wherein the bids for the first item and the bids for the one or more items of the lot of new items are received via a web-based bid form over the Internet.

3. A machine-readable medium having executable instructions that when executed by one or more machines perform operations of an electronic auction system, the operations comprising:

auctioning a first item based on a first auction format;

auctioning a lot of new items based on a second auction format; and receiving, at the electronic auction system, bids for the first item and bids for one or more items of the lot of new items, the auctioning of the first item based on the first auction format including automatically awarding the first item based on a high bid of one or more of the bids for the first item, and the auctioning of the lot of new items based on the second auction format including, using one or more processors, accessing an electronic auction database to obtain a posted minimum selling price for the one or more items, comparing the posted minimum selling price to a first bid of the bids for the one or more items, reserving the first bid in an electronic bid database operatively coupled to the electronic auction system based on the first bid not meeting the posted minimum selling price, the reserved first bid for the one or more items to be considered as a further bid for a further one or more items of the lot of new items, for sale at an adjusted minimum selling price, automatically awarding the one or more items based on a second bid at least meeting the posted minimum selling price, accessing the electronic auction database to obtain a desired sales volume associated with the lot of new items, determining an actual sales volume associated with the lot of new items using a number of the awarded one or more items, automatically adjusting the posted minimum selling price to calculate the adjusted minimum selling price for the further one or more items based on a result of comparing the desired sales volume with the actual sales volume, and providing instructions to update a merchandise catalog page with the adjusted minimum selling price for the further one or more items.

4. The machine-readable medium of claim 3, wherein the bids for the first item and the bids for the one or more items of the lot of new items are received via a web-based bid form over the Internet.

5. An electronic auction system including:

a first database and a second database; and one or more processors configured to access the first and second databases and to implement a processor-implemented auction manager, the auction manages configured to receive bids for a first item and bids for a second item different from the first item and to auction the first item by employing a first auction format and a second item by employing a second auction format, wherein the auction manager employing the first auction format for the first item is configured to award the first item when a first bid of the bids for the first item is a high bid, based on the first item being closed from bidding, and the auction manager employing the second auction format for the second item is configured to:

access the first databases to obtain a posted minimum selling price for the second item, compare the posted minimum selling price to a first bid of the bids for the second item, reserve the first bid for the second item in the second database in an event that the first bid for the second item does not meet the posted minimum selling price, automatically award the second item in a further event that a second bid at least meets the posted minimum selling price, determine an actual sales volume associated with the second item, automatically adjust the posted minimum selling price to calculate an adjusted minimum selling price for the second item based on a comparison between the actual sales volume and a desired sales volume associated with the second item, and award the second item based on a determination that the reserved first bid for the second item at least meets the adjusted minimum selling price, wherein the auction manager is configured to provide an indication of the award of the second item for visual display.

6. The system of claim 5, wherein the auction manager is configured to receive the bids for the first item and the bids for the second item via a web-based bid form over the Internet.

7. The method of claim 1, wherein the automatically adjusting the posted minimum selling price for the further one or more items includes automatically reducing the posted minimum selling price by a predetermined amount or a by a predetermined percentage of the posted minimum selling price, based on the actual sales volume not meeting the desired sales volume.

8. The method of claim 1, wherein the auctioning of the lot of new items based on the second auction format includes:

based on the reserved first bid at least meeting the adjusted minimum selling price, automatically converting the reserved first bid to an order, and thereby automatically awarding one or more of the further one or more items.

9. The method of claim 1, wherein the automatically adjusting the posted minimum selling price for the further one or more items includes automatically increasing the posted minimum selling price by a predetermined amount or a by a predetermined percentage of the posted minimum selling price, based on the actual sales volume meeting or exceeding the desired sales volume within a specified period of time.

10. The machine-readable medium of claim 3, wherein the automatically adjusting the posted minimum selling price for the further one or more items includes automatically reducing the posted minimum selling price by a predetermined amount or a by a predetermined percentage of the posted minimum selling price, based on the actual sales volume not meeting the desired sales volume.

11. The machine-readable medium of claim 3, wherein the auctioning of the lot of new items based on the second auction format includes:
    based on the reserved first bid at least meeting the adjusted minimum selling price, automatically converting the reserved first bid to an order, and thereby automatically awarding one or more of the further one or more items.

12. The machine-readable medium of claim 3, wherein the automatically adjusting the posted minimum selling price for the further one or more items includes automatically increasing the posted minimum selling price by a predetermined amount or a by a predetermined percentage of the posted minimum selling price, based on the actual sales volume meeting or exceeding the desired sales volume within a specified period of time.

13. The electronic auction system of claim 5, wherein the auction manager employing the second auction format for the second item is configured to automatically reduce the posted minimum selling price by a predetermined amount or a by a predetermined percentage of the posted minimum selling price, based on the comparison indicating that the actual sales volume does not meet the desired sales volume.

14. The electronic auction system of claim 5, wherein the auction manager employing the second auction format for the second item is configured to record the award of the second item in the first, second or further database based on the adjusted minimum selling price for the second item being less than or equal to the second bid.

15. The electronic auction system of claim 5, wherein the auction manager employing the second auction format for the second item is configured to automatically increase the posted minimum selling price by a predetermined amount or a by a predetermined percentage of the posted minimum selling price, based on the comparison indicating that the actual sales volume meets or exceeds the desired sales volume within a specified period of time.

\* \* \* \* \*

UNITED STATES PATENT AND TRADEMARK OFFICE
CERTIFICATE OF CORRECTION

| | | |
|---|---|---|
| PATENT NO. | : 7,870,055 B2 | |
| APPLICATION NO. | : 10/316298 | |
| DATED | : January 11, 2011 | |
| INVENTOR(S) | : Alan S. Fisher et al. | |

It is certified that error appears in the above-identified patent and that said Letters Patent is hereby corrected as shown below:

On the cover page, item (56), under "Other Publications", in column 2, line 1, delete "Weeks," and insert -- Week, --, therefor.

On page 3, under "Other Publications", in column 1, line 16, delete ""Disposition" and insert -- "Deposition --, therefor.

On page 3, under "Other Publications", in column 1, line 20, delete ""Disposition" and insert -- "Deposition --, therefor.

On page 3, under "Other Publications", in column 1, line 53, delete "Disposition" and insert -- Deposition --, therefor.

On page 3, under "Other Publications", in column 1, line 57, delete "Disposition" and insert -- Deposition --, therefor.

On page 3, under "Other Publications", in column 1, line 71, delete "Deialectic" and insert -- Dialectic --, therefor.

On page 3, under "Other Publications", in column 2, line 8, delete "Strategice" and insert -- Strategic --, therefor.

On page 3, under "Other Publications", in column 2, line 14, delete "Camputer" and insert -- Computer --, therefor.

On page 3, under "Other Publications", in column 2, line 26, delete "eBayInc.," and insert -- eBay Inc., --, therefor.

On page 3, under "Other Publications", in column 2, line 50, delete "Regerence" and insert -- Reference --, therefor.

On page 3, under "Other Publications", in column 2, line 56, delete "Insitutions:" and insert -- Institutions: --, therefor.

Signed and Sealed this
Twenty-ninth Day of March, 2011

David J. Kappos
*Director of the United States Patent and Trademark Office*

CERTIFICATE OF CORRECTION (continued)

On page 3, under "Other Publications", in column 2, line 60, delete "Economi" and insert -- Economic --, therefor.

On page 4, under "Other Publications", in column 1, line 38, delete "Merhandisers," and insert -- Merchandisers, --, therefor.

On page 4, under "Other Publications", in column 1, line 38, delete "Supermarker" and insert -- Supermarket --, therefor.

On page 4, under "Other Publications", in column 1, line 40, delete "Rockoff,Todd" and insert -- Rockoff, Todd --, therefor.

On page 4, under "Other Publications", in column 2, line 51, delete "Electornic" and insert -- Electronic --, therefor.

On page 4, under "Other Publications", in column 2, line 55, delete "Acution,"" and insert -- Auction," --, therefor.

On page 4, under "Other Publications", in column 2, line 58, delete "Specificaiton" and insert -- Specification --, therefor.

On page 4, under "Other Publications", in column 2, line 58, delete "Electornic" and insert -- Electronic --, therefor.

On page 4, under "Other Publications", in column 2, line 59, delete "IcIS" and insert -- ICIS --, therefor.

On page 5, under "Other Publications", in column 2, line 48, delete "OARN,21" and insert -- OARN, 21 --, therefor.

On page 5, under "Other Publications", in column 2, line 56, delete "Statemen" and insert -- Statement --, therefor.

On page 5, under "Other Publications", in column 2, line 62, delete "Sarah ," and insert -- Sarah, --, therefor.

On page 5, under "Other Publications", in column 2, line 62, delete "Sentinal," and insert -- Sentinel, --, therefor.

On page 7, under "Other Publications", in column 1, line 11, delete "Noninfrigement" and insert -- Noninfringement --, therefor.

On page 7, under "Other Publications", in column 1, line 49, after "27-28" insert --- . --.

On page 7, under "Other Publications", in column 1, line 51, after "77-88" insert -- . --.

On page 7, under "Other Publications", in column 1, line 57, after "749-758" insert -- . --.

CERTIFICATE OF CORRECTION (continued)
U.S. Pat. No. 7,870,055 B2

On page 7, under "Other Publications", in column 1, line 64, delete "Heng-Wa," and insert -- Heng-Wah, --, therefor.

On page 7, under "Other Publications", in column 1, line 69, delete "Exhitbit" and insert -- Exhibit --, therefor.

On page 7, under "Other Publications", in column 2, line 44, delete "Propert" and insert -- Property --, therefor.

On page 8, under "Other Publications", in column 1, line 7, delete "10/648,213," and insert -- 11/648,213, --, therefor.

On page 8, under "Other Publications", in column 2, line 1, delete "10/618,632," and insert -- 11/618,632, --, therefor.

On Sheet 5 of 12, Figure 5, Triangle Box. 41, line 2, delete "COSTOMER" and insert -- CUSTOMER --, therefor.

On Sheet 7 of 12, Figure 7, Box. 69, line 1, delete "PROX" and insert -- PROXY --, therefor.

On Sheet 8 of 12, Figure 9, Box. 99, line 2, delete ""UNSUCCESSFULL"" and insert -- "UNSUCCESSFUL" --, therefor.

On Sheet 8 of 12, Figure 9, Box. 95, line 2, delete ""SUCCESSFULL"" and insert -- "SUCCESSFUL" --, therefor.

In column 10, line 51, in Claim 1, after "format" delete "d".

In column 12, line 48, in Claim 7, after "or" delete "a".

In column 12, line 61, in Claim 9, after "or" delete "a".

In column 13, line 2, in Claim 10, after "or" delete "a".

In column 13, line 16, in Claim 12, after "or" delete "a".

In column 14, line 2, in Claim 13, after "or" delete "a".

In column 14, line 16, in Claim 15, after "or" delete "a".